United States Patent
Robinson et al.

(10) Patent No.: US 11,734,177 B2
(45) Date of Patent: *Aug. 22, 2023

(54) MEMORY INTERFACE HAVING MULTIPLE SNOOP PROCESSORS

(71) Applicant: Imagination Technologies Limited, Kings Langley (GB)

(72) Inventors: Martin John Robinson, Leighton Buzzard (GB); Mark Landers, Hartwell (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/446,133

(22) Filed: Aug. 26, 2021

(65) Prior Publication Data

US 2021/0390052 A1 Dec. 16, 2021

Related U.S. Application Data

(63) Continuation of application No. 15/922,258, filed on Mar. 15, 2018, now Pat. No. 11,132,299.

(30) Foreign Application Priority Data

Feb. 28, 2018 (GB) ..................................... 1803291

(51) Int. Cl.
*G06F 12/0831* (2016.01)
*G06F 12/10* (2016.01)
(Continued)

(52) U.S. Cl.
CPC ...... *G06F 12/0831* (2013.01); *G06F 12/0833* (2013.01); *G06F 12/0846* (2013.01);
(Continued)

(58) Field of Classification Search
CPC ............ G06F 12/0831; G06F 12/0833; G06F 12/0846; G06F 12/10; G06F 12/1018; G06F 13/1673; G06F 13/4068; G06F 2212/62

See application file for complete search history.

(56) References Cited

U.S. PATENT DOCUMENTS

| | | | |
|---|---|---|---|
| 5,555,382 A | 9/1996 | Thaller et al. | |
| 5,900,017 A * | 5/1999 | Genduso | ............. G06F 12/0835 711/119 |

(Continued)

FOREIGN PATENT DOCUMENTS

| | | |
|---|---|---|
| EP | 2104042 A1 | 9/2009 |
| GB | 253650 A | 6/2016 |

(Continued)

*Primary Examiner* — Nanci N Wong
(74) *Attorney, Agent, or Firm* — Potomac Law Group, PLLC; Vincent M DeLuca

(57) ABSTRACT

A memory interface for interfacing between a memory bus and a cache memory, comprising: a plurality of bus interfaces configured to transfer data between the memory bus and the cache memory; and a plurality of snoop processors configured to receive snoop requests from the memory bus; wherein each snoop processor is associated with a respective bus interface and each snoop processor is configured, on receiving a snoop request, to determine whether the snoop request relates to the bus interface associated with that snoop processor and to process the snoop request in dependence on that determination.

20 Claims, 13 Drawing Sheets

(51) Int. Cl.
  *G06F 12/0846* (2016.01)
  *G06F 12/1018* (2016.01)
  *G06F 13/16* (2006.01)
  *G06F 13/40* (2006.01)

(52) U.S. Cl.
  CPC .......... *G06F 12/10* (2013.01); *G06F 13/1673* (2013.01); *G06F 13/4068* (2013.01); *G06F 12/1018* (2013.01); *G06F 2212/62* (2013.01)

(56) References Cited

U.S. PATENT DOCUMENTS

| | | | |
|---|---|---|---|
| 5,923,898 A | 7/1999 | Genduso et al. | |
| 6,006,029 A | 12/1999 | Bianchi et al. | |
| 6,480,941 B1* | 11/2002 | Franke | G06F 12/0284 711/E12.013 |
| 6,594,734 B1* | 7/2003 | Kyker | G06F 12/0875 711/146 |
| 7,032,079 B1 | 4/2006 | Bauman et al. | |
| 7,356,652 B1* | 4/2008 | Dew | G06F 12/0831 711/146 |
| 7,451,248 B2 | 11/2008 | Daly, Jr. et al. | |
| 7,685,354 B1 | 3/2010 | Hetherington et al. | |
| 8,990,505 B1* | 3/2015 | Jamil | G06F 12/0895 711/128 |
| 2003/0167379 A1 | 9/2003 | Soltis, Jr. | |
| 2004/0003184 A1* | 1/2004 | Safranek | G06F 12/082 711/146 |
| 2004/0225819 A1 | 11/2004 | Ang | |
| 2004/0236888 A1* | 11/2004 | Dieffenderfer | G06F 12/0831 710/112 |
| 2007/0073979 A1* | 3/2007 | Tsien | G06F 12/0831 711/146 |
| 2011/0060879 A1 | 3/2011 | Rogers et al. | |
| 2012/0110270 A1* | 5/2012 | Moyer | G06F 12/0831 711/146 |
| 2013/0138847 A1* | 5/2013 | Lai | G06F 13/00 710/110 |
| 2014/0095806 A1 | 4/2014 | Fajardo et al. | |
| 2014/0143497 A1 | 5/2014 | Olson et al. | |
| 2017/0139629 A1 | 5/2017 | Van Lunteren | |
| 2017/0185516 A1 | 6/2017 | Stevens et al. | |

FOREIGN PATENT DOCUMENTS

| | | |
|---|---|---|
| WO | 99/41669 A1 | 8/1999 |
| WO | 2006/104747 A2 | 10/2006 |
| WO | 2018/167455 A1 | 9/2018 |

* cited by examiner

MEMORY INTERFACE HAVING MULTIPLE SNOOP PROCESSORS

CROSS-REFERENCE TO RELATED APPLICATIONS AND CLAIM OF PRIORITY

This application is a continuation under 35 U.S.C. 120 of copending application Ser. No. 15/922,258 filed Mar. 15, 2018, which claims foreign priority under 35 U.S.C. 119 from United Kingdom Application No. 1803291.2 filed Feb. 28, 2018.

BACKGROUND OF THE INVENTION

This invention relates to memory interfaces, in particular to memory interfaces for interfacing between a memory bus and a cache memory which comprise a plurality of bus interfaces.

Conventional computing systems comprise a memory bus which couples to a cache memory. Some systems comprise a bus which couples to more than one cache memory, or to more than one cache bank at a cache memory. Each memory may have a separate access path to the bus, for example to permit parallel processing. There is the potential for data conflicts to arise between the different paths. It is possible to receive multiple requests along more than one of the different data paths which comprise the same destination address. This can cause problems in processing the multiple requests to avoid conflicts, processing delays and/or inaccurate responses being sent to the requests. This can be particularly relevant in a coherent system.

There is therefore a need to address such issues.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to an aspect of the present disclosure, there is provided a memory interface for interfacing between a memory bus and a cache memory, comprising:
  a plurality of bus interfaces configured to transfer data between the memory bus and the cache memory; and
  a plurality of snoop processors configured to receive snoop requests from the memory bus;
  wherein each snoop processor is associated with a respective bus interface and each snoop processor is configured, on receiving a snoop request, to determine whether the snoop request relates to the bus interface associated with that snoop processor and to process the snoop request in dependence on that determination.

Suitably each snoop processor is configured to determine whether the snoop request relates to the bus interface associated with that snoop processor in dependence on a memory addressed by the snoop request, and to generate a response to the snoop request in dependence on that determination.

Suitably the memory interface comprises a data structure configured to maintain a mapping between each of the plurality of bus interfaces and respective sets of memory addresses.

Suitably each of the respective sets of memory addresses comprises at least one of a list of memory addresses and a range of memory addresses.

Suitably the cache memory comprises a plurality of cache banks, and each bus interface is configured to transfer data to one or more cache bank associated with that bus interface. Suitably each snoop processor is configured to map the memory addressed by the snoop request to a cache bank of the plurality of cache banks in a first mapping, and to map the cache bank to one of the plurality of bus interfaces in a second mapping. Suitably each snoop processor is configured to perform at least one of the first mapping and the second mapping by using a hash function.

Suitably the first mapping is one of a one-to-one mapping between the memory addressed by the snoop request and the cache bank and a mapping permitting the memory addressed by the snoop request to map to more than one cache bank.

Suitably each snoop processor is configured to determine that the snoop request does not relate to the bus interface associated with that snoop processor where the memory addressed by the snoop request does not map to the bus interface associated with that snoop processor. Suitably each snoop processor is configured to determine that the snoop request does not relate to the bus interface associated with that snoop processor where the mapping does not comprise the memory addressed by the snoop request.

Suitably the memory interface comprises a cache line status data structure configured to store status information relating to cache lines at the cache memory, each snoop processor being configured to generate a response to the snoop request in dependence on status information stored in the cache line status data structure if the snoop request relates to the bus interface associated with that snoop processor.

Suitably, where the status information indicates that the cache line is at least one of:
  in an invalid state,
  undergoing spilling, and
  undergoing a writeback or eviction process,
the associated snoop processor is configured to determine that the snoop request results in a cache miss and to cause a corresponding response to the snoop request to be sent on the bus.

Suitably at least one of the snoop processors is configured to process the snoop request by accessing the cache.

Suitably at least one of the snoop processors is configured, on determining that the snoop request does not relate to the bus interface associated with that snoop processor, to cause a response to be sent on the bus without accessing the cache memory.

Suitably each snoop processor comprises a bus calculation module for calculating the bus interface to which the snoop request relates.

Suitably the bus calculation module is configured to calculate the bus interface to which the snoop request relates in dependence on the mapping maintained at the data structure.

Suitably the bus calculation module is configured to perform at least one of the first mapping and the second mapping.

Suitably each snoop processor comprises a buffer for storing received snoop requests. Suitably the buffer comprises a first in, first out buffer. Suitably each snoop processor is configured to process snoop requests on the buffer in a different order to that in which the snoop requests were received. Suitably each snoop processor is configured to use the buffer to output responses to snoop requests in an order corresponding to the order in which the snoop requests were received.

Suitably each snoop processor comprises control logic for at least one of controlling access to the cache line status data structure, accessing the cache, sending commands to the cache, and issuing responses to snoop requests.

Suitably the memory addressed by the snoop request is a physical address in a physical address space, and the cache memory uses a virtual address space, the memory interface comprising a reverse translation module configured to maintain a mapping from the physical address space to the virtual address space, the reverse translation module being configured to translate the snoop request to a translated snoop request addressed in the virtual address space. Suitably the reverse translation module comprises logic that calculates the virtual address in dependence on the physical address, based on a known relationship between the physical address space and the virtual address space. Suitably the reverse translation module comprises a reverse translation data structure configured to maintain a mapping from the physical address space to the virtual address space. Suitably the reverse translation data structure comprises a directory linking a physical address in the physical address space to a corresponding virtual address in the virtual address space.

Suitably the cache memory is the lowest level of a cache hierarchy of a device connected to the memory bus.

Suitably the memory interface is embodied in hardware on an integrated circuit.

According to another aspect of the present disclosure, there is provided a method for interfacing, at a memory interface, between a memory bus and a cache memory, the memory interface comprising a plurality of bus interfaces configured to transfer data between the memory bus and the cache memory, and a plurality of snoop processors configured to receive snoop requests from the memory bus, each snoop processor being associated with a respective bus interface, the method comprising:

receiving a snoop request at the memory interface;
each snoop processor determining whether the snoop request relates to its associated respective bus interface; and
each snoop processor processing the snoop request in dependence on that determination.

Suitably the determining comprises determining whether the snoop request relates to the bus interface associated with that snoop processor in dependence on a memory addressed by the snoop request, and wherein the processing comprises generating a response to the snoop request in dependence on that determination.

Suitably the determining comprises determining whether the snoop request relates to the bus interface associated with that snoop processor in dependence on a mapping between each of the plurality of bus interfaces and respective sets of memory addresses.

Suitably the cache memory comprises a plurality of cache banks, and each bus interface is configured to transfer data to one or more cache bank associated with that bus interface, and wherein the determining comprises mapping the memory addressed by the snoop request to a cache bank of the plurality of cache banks in a first mapping, and mapping the cache bank to one of the plurality of bus interfaces in a second mapping. Suitably at least one of the first mapping and the second mapping is performed using a hash function. Suitably the first mapping is one of a one-to-one mapping between the memory addressed by the snoop request and the cache bank and a mapping permitting the memory addressed by the snoop request to map to more than one cache bank.

Suitably the memory interface comprises a cache line status data structure configured to store status information relating to cache lines at the cache memory, and wherein the processing comprises generating a response to the snoop request in dependence on status information stored in the cache line status data structure.

Suitably the processing comprises processing the snoop request by accessing the cache.

Suitably the processing comprises, on determining that the snoop request does not relate to the bus interface associated with that snoop processor, causing a response to be sent on the bus without accessing the cache memory.

Suitably the method further comprises receiving further snoop requests at the memory interface and processing the snoop requests in a different order to that in which the snoop requests were received.

Suitably the method further comprises outputting responses to snoop requests in an order corresponding to the order in which the snoop requests were received.

Suitably the memory addressed by the snoop request is a physical address in a physical address space, and the cache memory uses a virtual address space, the method further comprising maintaining a mapping from the physical address space to the virtual address space, and, in accordance with the maintained mapping, translating the snoop request to a translated snoop request addressed in the virtual address space.

According to another aspect of the present disclosure, there is provided a method of manufacturing, using an integrated circuit manufacturing system, a memory interface as described herein.

According to another aspect of the present disclosure, there is provided an integrated circuit definition dataset that, when processed in an integrated circuit manufacturing system, configures the system to manufacture a memory interface as described herein.

According to another aspect of the present disclosure, there is provided a non-transitory computer readable storage medium having stored thereon a computer readable description of an integrated circuit that, when processed in an integrated circuit manufacturing system, causes the integrated circuit manufacturing system to manufacture a memory interface as described herein.

According to another aspect of the present disclosure, there is provided an integrated circuit manufacturing system configured to manufacture a memory interface as described herein.

According to another aspect of the present disclosure, there is provided an integrated circuit manufacturing system comprising: a non-transitory computer readable storage medium having stored thereon a computer readable integrated circuit description that describes a memory interface as described herein; a layout processing system configured to process the integrated circuit description so as to generate a circuit layout description of an integrated circuit embodying the memory interface; and an integrated circuit generation system configured to manufacture the memory interface according to the circuit layout description.

According to another aspect of the present disclosure, there is provided computer program code for performing a method as described herein.

According to another aspect of the present disclosure, there is provided a non-transitory computer readable storage medium having stored thereon computer readable instructions that, when executed at a computer system, cause the computer system to perform the method as described herein.

Any one or more feature of any aspect above may be combined with any one or more feature of any other aspect above. Any apparatus feature may be rewritten as a method feature, with the necessary changes being made in the wording. These have not been written out in full here merely for the sake of brevity.

BRIEF DESCRIPTION OF THE DRAWINGS

The present invention will now be described by way of example with reference to the accompanying drawings. In the drawings.

DETAILED DESCRIPTION OF THE INVENTION

Figure 1A:
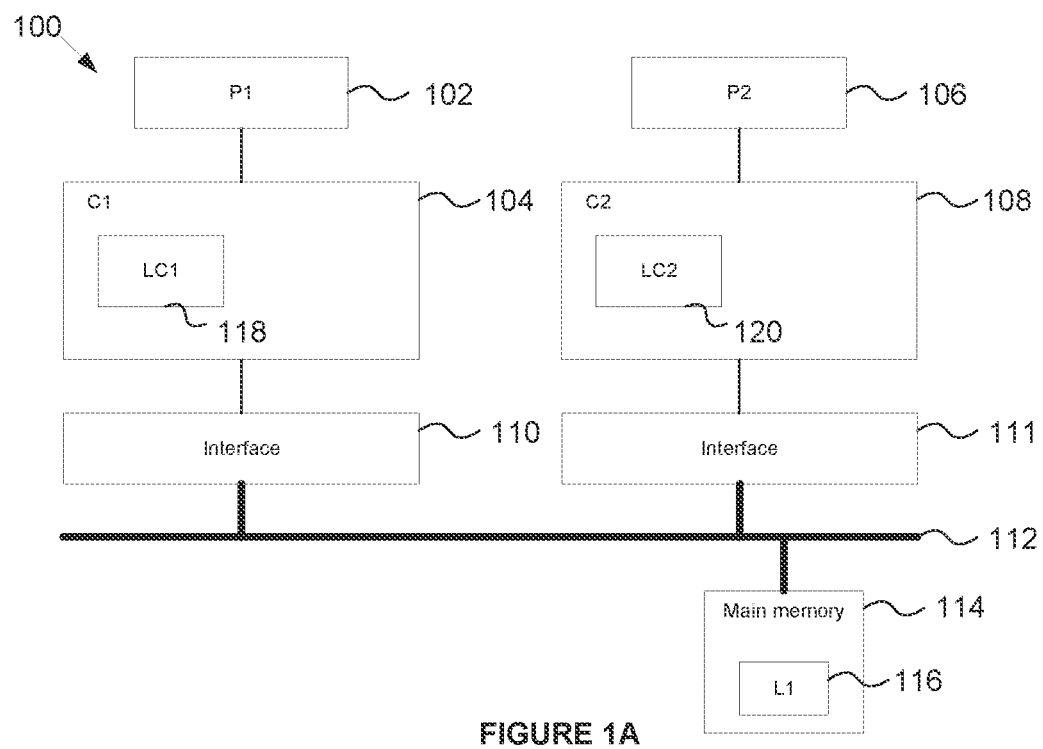
FIG. 1A schematically shows a system comprising multiple processors and multiple caches.

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

A computing system such as computing system 100 comprises a first processor 102, a first cache memory 104 and a main memory 114. The main memory 114 is suited for storing data longer-term than the first cache memory 104. For instance, the main memory 114 is less volatile than the first cache memory 104. The main memory 114 also typically has a much greater storage capacity than the first cache memory 104. The main memory 114 may be remote from the first processor 102. The first cache memory 104 is generally provided at the first processor 102, or adjacent the first processor 102 in a data path, so as to be between the first processor 102 and the main memory 114.

Data at the first cache memory and/or at the main memory can be accessed, for example by the first processor, via a read transaction. Data can be written to the first cache memory and/or to the main memory via a write transaction. For example, data can be written by the first processor to the first cache memory and/or to the main memory.

The cache 104 is configured to store data such that the processor 102 can retrieve that data from the cache 104 (and/or write modified data to the cache 104) rather than needing to retrieve that data directly from the main memory 114 (and/or write modified data to the main memory 114). An access to the cache is faster than a corresponding access to the main memory, often significantly so. This means that transactions, such as read or write transactions, on the cache can complete much faster than corresponding transactions on the main memory. This helps reduce delays in the system.

The computing system 100 may initialize with no data in the first cache 104. All relevant data may instead just be stored in the main memory 114. On issuing a read request for data at a particular physical address in the main memory by the processor (or an instruction at the processor), for example as part of a read transaction, it is determined that there is a 'cache miss', i.e. the required data is not contained in the cache (since there is no data in the cache yet). On determining the cache miss, the addressed data is fetched from the main memory, for example in response to the read request. Typically, the physical address will specify a location within a memory page. Suitably an entire line of data (e.g. 64 bytes in one example) rather than just data at the specified location is fetched. This is because, due to data locality in the main memory, there is an increased chance that data at locations adjacent the specified location will also be needed in subsequent transactions.

The fetched data will be stored in the cache in a location with a cache address that corresponds to the main memory physical address from which the data was read. This enables the data in the cache to be accessed when a subsequent request is made for that data. The data can be stored in a portion of the cache called a 'cache line'.

The cache is faster to access than the main memory. Where the processor subsequently issues a read instruction for the same address, i.e. to the cache address where the data is stored, the cache will return a 'cache hit', i.e. indicating that the data is present in the cache, and will return the data (from the relevant cache line) to the processor from the cache without needing to access the main memory. Thus this read transaction can complete much faster due to the cache having a lower latency than the main memory.

The cache adjacent the system bus may be physically addressed, meaning that the physical addresses of the main memory data entries are also used to address the cache. This reduces system complexity since the same address can be used to address the cache as to address the main memory.

In transactions from a processor requiring a write to a main memory location, the write can be applied to the main memory location straight away. This can take a relatively long time to complete due to the latency of the main memory. Alternatively, the write can occur to the cache line in the cache which is associated with that main memory location. Thus, where a processor initiates a write transaction, the write can occur to a physically-addressed location in the cache. The write need not immediately occur to the corresponding physically-addressed location in main memory. The write to the cache can be much faster than a write to the main memory, thus reducing the time needed to complete the write transaction, reducing latency in the system.

The write transaction can complete in different ways. In one situation, a write transaction to the main memory (corresponding to the completed write transaction to the cache) can be queued, and can occur at some later time. The processor need not wait for this to happen, but can continue processing other instructions in parallel. In another situation, the write transaction can stop at the cache, i.e. there will be no write transaction queued on the main memory. This means that the modified data in the cache will not be written to the main memory. The data in the corresponding location in the main memory is then old, or out-of-date. In this case, it can be useful to identify that the cached data is the most up-to-date version and that the main memory does not contain this up-to-date version. This can be done, for example, using a flag, which can be represented by a bit, associated with the cached data. This bit may be in the cache. This bit can be called a 'dirty' bit and indicates that the cache line is 'dirty', i.e. data in the cache line has not been written back to the main memory since a modification has occurred.

On a subsequent write of this cache line data back to the main memory (such a transaction can be called a 'writeback' transaction), the dirty bit or flag can be cleared to indicate that that cache line contains the same data as at the corresponding address in the main memory, i.e. it is 'clean'. This might occur as part of a subsequent transaction, or as part of a shutdown procedure to replicate the updated cache contents in the main memory prior to powering down the cache and losing the cache contents.

Following a writeback transaction, data in that cache line may remain in the portion of the cache at which it was originally written, i.e. the cache line, permitting subsequent access to that data in that cache line in the cache, or it may be evicted or flushed from the cache line. When cache line data is evicted from the cache line, it will free up space for further data to be stored in that cache line.

Cache Line States

It is useful to introduce different cache line states at this stage. Where the system is initialised with no data in the cache, each cache line may be empty. The state of these cache lines can be considered to be 'invalid', i.e. there is no valid data in the cache lines. A cache line can be in an 'invalid' state where it does not comprise a copy of any memory line from main memory (or where any data contained in the cache line is marked as invalid in an appropriate way). A cache line can be in a 'unique' state where it comprises the only valid copy of the memory line, i.e. any other copies of the memory line (at other caches for example) are not valid. A cache line can be in a 'dirty' state if the data in that cache line is dirty. In respect of a 'dirty' state of a cache line, a respective processor (or more generally a master—see below) coupled to the cache comprising that cache line may be responsible for writing the data in the cache line back to the memory. A cache line can be in a 'clean' state if the data in that cache line is clean. In respect of a 'clean' state of a cache line, a respective processor (or more generally a master—see below) coupled to the cache comprising that cache line is not responsible for writing back the data in the cache line.

Where data in a cache line is evicted or flushed from that cache line, that cache line can be marked as invalid, and/or the data overwritten and/or otherwise deleted, and so that data may be unavailable for subsequent access in the cache.

Typically a system will comprise at least two levels of cache: a Level 1 (L1) cache at a processor (the L1 cache may be part of the processor), and a Level 2 (L2) cache, typically in the data path between the L1 cache and the main memory. Usually, the lowest-level cache is physically-addressed. The lowest-level cache is the cache closest in the data path to the bus coupling to the main memory, for example the L2 cache in a system with just two cache levels, or a Level 3 cache in a system with three cache levels, and so on. The provision of a physically-addressed lowest-level cache can avoid issues with address aliasing, and can also permit enhanced compatibility between the cache and the main memory since instructions on the bus coupling the lowest-level cache to the main memory are typically physically-addressed. Hence, with a physically-addressed cache, both the cache and the bus will operate in the same address space, i.e. the physical address space.

Modern systems comprise a plurality of processors for increased performance. In such systems there may be a shared cache between the plurality of processors and the main memory, or there may be a plurality of caches, for example one cache per processor, as illustrated schematically in FIG. 1A. Referring to FIG. 1A, a first processor, P1 102, has associated with it a first cache, C1 104. A second processor, P2 106, has associated with it a second cache C2 108. The caches C1, C2, are connected via interfaces 110 111 to a bus 112. The bus 112 couples to a main memory 114. The interfaces 110 111 can comprise memory management units (MMU). The MMU is able to translate from virtual addresses used in higher levels of the cache memory hierarchy to physical addresses used in lower levels of the cache memory hierarchy and in the main memory. To do this, the MMU can comprise or have access to a table that stores a mapping from the virtual address space to the physical address space. Typically the MMU will map the entire virtual address space to the physical address space.

Figure 1B:
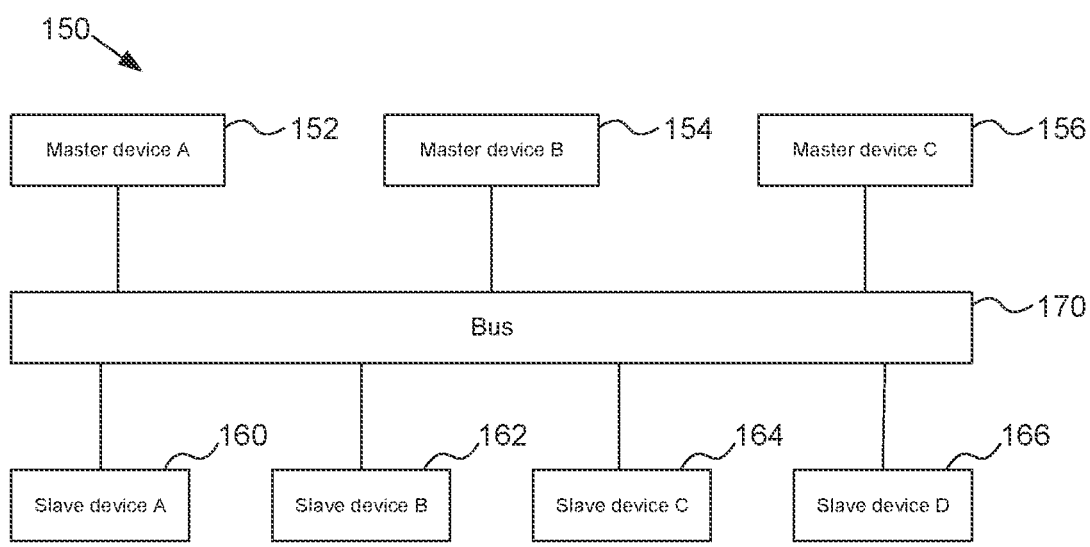
FIG. 1B schematically shows a master-slave system.

More generally, as illustrated in FIG. 1B, a computing system 150 may comprise a plurality of master (or primary) devices that can couple to a plurality of slave (or secondary) devices. As illustrated, three master devices (master device A 152, master device B 154 and master device C 156) are coupled to four slave devices (slave device A 160, slave device B 162, slave device C 164 and slave device D 166). The numbers of masters and slaves may be the same, or they may be different. The master devices 152, 154, 156 couple to the slave devices 160, 162, 164 via a bus, communication fabric or network-on-chip (NoC) 170. Conceptually, a master device is a device which can initiate a transaction; a slave device is a device which responds to the transaction. For example, a master device can issue a write transaction, which may be over a write data channel, to perform a write of data from the master to a slave. A master device can issue a read transaction, which may be over a read data channel, to perform a read of data at a slave by the master. One or more master device may be a processor. The computing system may be a multiprocessor system. A master device may be a central processing unit (CPU). A master device may be a graphics processing unit (GPU). One or more master device may be a peripheral. One or more slave device may be a memory store, for example a cache memory or a main memory. A cache memory may be provided in respect of each processor.

In systems such as the ones illustrated in FIGS. 1A and 1B, data coherency should be considered, since it is possible for more than one master device, such as a processor, to attempt to access data at the same physical address in the main memory. For example, the first processor P1 102 can access a location L1 116 in the main memory 114 in a read transaction, and can store a copy of the data at L1 in its local cache C1 104 at a location LC1 118. The second processor P2 106 can afterwards access L1 116 in a write transaction, and can modify the data stored at L1. It is also possible for the second processor to modify a local copy of the data stored in its local cache at a location LC2 120 instead of or as well as modifying the data at location L1 in the main memory 114. In either case, the data stored at LC1 will be out-of-date. A subsequent read by the first processor would therefore read the incorrect data stored at LC1.

The system therefore suitably has a way to identify transactions by the different processors and to avoid subsequent use of out-of-date data. One way of doing this is by monitoring all transactions on the bus to identify when a processor issues a transaction at a physical address that is already cached at a cache associated with a different processor, i.e. whether another cache 'owns' the particular data stored at a cache line. Such monitoring of traffic on the bus can be called 'snooping'.

Snooping can identify when a physical address in the main memory is being accessed, where a local copy of that data is already stored in a cache line. Since the lowest-level caches are conventionally physically-addressed, the snooping can monitor for a transaction on a physical address which is used in another cache.

The present inventors have realised that it is desirable to provide for the lowest-level cache to be virtually-addressed, meaning that the lowest-level cache is addressed in a virtual address space rather than the physical address space of the main memory. The virtual address space can be larger than the physical address space. An advantage of a virtual address space is that processor instructions (such as programs running on the processor) need not be concerned with the physical address space underlying the system, but can instead operate wholly within the desired virtual address space. This can provide additional cache space which is more easily accessible by program instructions whilst still operating in the virtual address space. When providing for the lowest-level cache to be virtually-addressed, it is also desirable to maintain data coherency between such a cache and another cache in a system.

Transactions received at the virtually-addressed coherent cache via the bus (rather than from the higher-level caches), i.e. snoop transactions (or snoop requests) on the bus which are transmitted to the cache, will be associated with physical addresses in the physical address space, such as that used at the main memory. The address translation that can be performed in typical systems at the MMU is from the virtual address to the physical address. This is so that read and write requests generated at the processor (in the virtual address space) can properly be addressed to the main memory (in the physical address space). Reverse address translation, i.e. from the physical address space to the virtual address space, is not conventionally performed at a MMU. To obtain a reverse address translation at a MMU it would be necessary to carry out an exhaustive search of all physical addresses corresponding to cache lines in the cache to be able to identify which virtual address corresponds to a received physical address. In some instances, a cache may be provided as a set-associative cache; the search would then need to be exhaustively performed across each of the sets in the cache. As mentioned, typically the MMU will map the whole virtual address space to the physical address space. Searching through all of the physical addresses would be a very time-consuming process, and would be highly likely to lead to large latency increases in the system.

Reverse Translation

The present inventors have identified that the provision of additional functionality in or associated with an interface between the lowest-level cache and the bus can be useful. This additional functionality comprises a physical to virtual address translation (a 'reverse translation') for translating physical addresses received over the bus into virtual addresses in the cache which correspond to the received physical addresses. A memory request such as a snoop request may be received over the bus. The memory request may be addressed in the physical address space. The memory request can be translated into a translated request, where the translated request is addressed in the virtual address space.

The memory interface, between the bus and the cache memory, may implement a coherency manager which is able to continuously track cache lines within a device's lowest-level cache which have been marked as coherent. The lowest-level cache may be implemented as a Virtually-Indexed and Virtually-Tagged (VIVT) cache. Thus the memory interface may be able to perform reverse address translations, because incoming snoop requests, for example via the ACE protocol, will always supply physical addresses and these are converted to virtual addresses to permit them to be associated with matching cache lines within the lowest-level cache.

The reverse translation functionality can be provided by a reverse translation module. The reverse translation module is configured to calculate the virtual address in dependence on the physical address, based on a known relationship between the physical address space and the virtual address space. This can provide latency reductions when compared to carrying out an exhaustive search for the physical addresses in the cache. The reverse translation module may be implemented in software, hardware or a combination of software and hardware. For example, the reverse translation module may be implemented in fixed function hardware. The reverse translation module may comprise logic that calculates the virtual address in dependence on the physical address, based on a known relationship between the physical address space and the virtual address space.

The reverse translation functionality can additionally or alternatively be obtained by providing a data structure for the reverse translation functionality. The data structure may be a table, or other similar structure, as will be discussed in more detail below. The data structure may be located at an interface such as the memory interface which sits, for example logically, between the lowest-level cache and the bus. The data structure can comprise a directory linking the physical addresses to corresponding virtual addresses. Thus when a transaction such as a memory request identifies a physical address, the virtual address corresponding to that physical address can be looked up in the reverse translation data structure. This permits the relevant virtual address in the cache to be accessed with a lower latency than would otherwise be the case.

Figure 2:
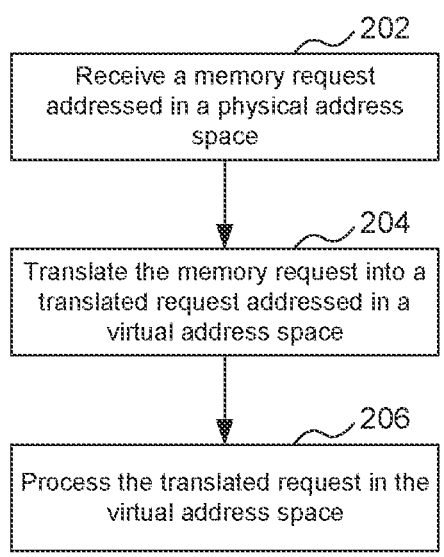
FIG. 2 illustrates a process for receiving a memory request.

The present approach permits a memory request to be received which is addressed in a physical address space (step 202 of FIG. 2). The memory request, such as a snoop request, can be a request to a cache from a bus. The received memory request is translated into a translated memory request (204). The translated memory request is addressed in a virtual address space, such as the virtual address space of the lowest-level cache. Since the translated request is addressed in the address space of the lowest-level cache (i.e. it is virtually addressed within the virtual address space), the translated request will then appropriately address a virtually-addressed memory location in the cache, and can therefore be processed in the virtual address space (206).

Figure 3:
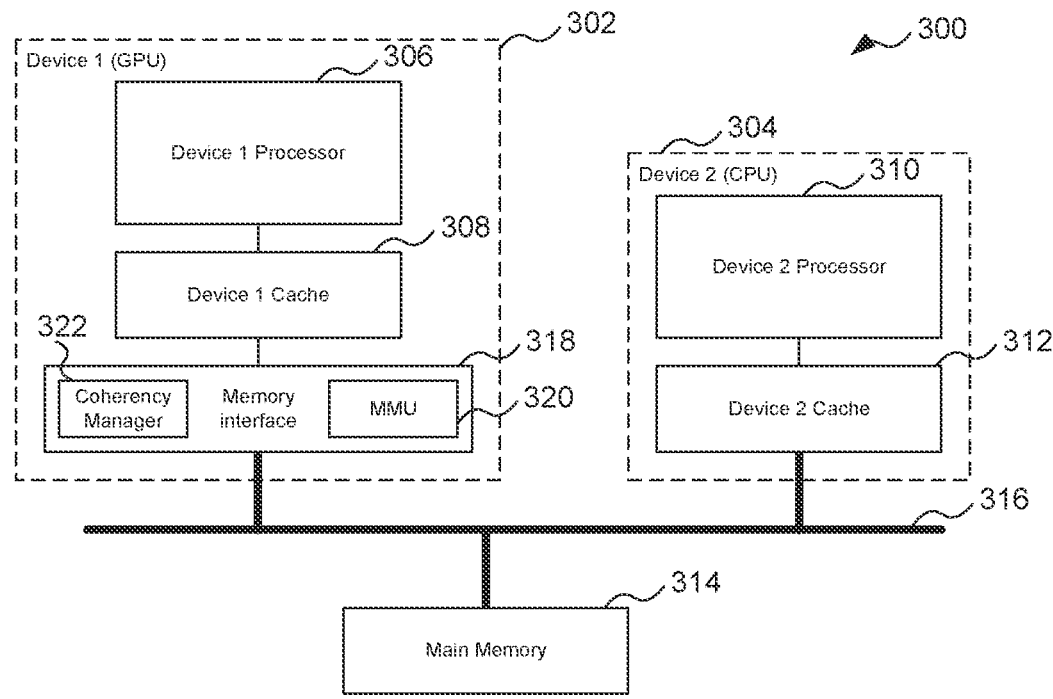
FIG. 3 schematically shows another system comprising multiple processors and multiple caches.

Example system architectures will now be described with reference to FIGS. 3 and 4. FIG. 3 schematically illustrates a system 300 comprising two devices or masters: Device 1 302 and Device 2 304. As illustrated Device 1 is a graphics processing unit (GPU) and Device 2 is a central processing unit (CPU). However, the application of the techniques discussed herein are not limited to one or more CPU and one or more GPU, but can be extended to any multiprocessor system, or more generally a master-slave system with multiple master and slave devices. Device 1 comprises a processor 306 and a cache 308. Similarly, Device 2 comprises a processor 310 and a cache 312. The Device 1 cache 308 and the Device 2 cache 312 couple to a main memory 314 over a memory bus 316. Device 1 302 comprises a memory interface 318. The interface 318 is shown as being between the cache 308 and the bus 316, but this need not be the case in all examples. In some examples, it is sufficient that the interface 318 couples to the cache 308 and to the bus 316. The interface 318 suitably couples directly to the cache 308 and to the bus 316 (i.e. there is no other module or processing unit serving to translate the address that is provided either between the interface and the cache or between the interface and the bus).

The memory interface 318 comprises a MMU 320 for translating virtual addresses to physical addresses. The memory interface 318 comprises a coherency manager 322. The structure and operation of the coherency manager will be explained in more detail below. The coherency manager 322 is configured to maintain coherency of the address space used by Device 1 and Device 2, e.g. an address space encompassing the Device 1 cache 308, the Device 2 cache 312 and the main memory 314. The coherency manager is configured to perform the reverse translation, i.e. translating physical addresses to virtual addresses.

Figure 4:
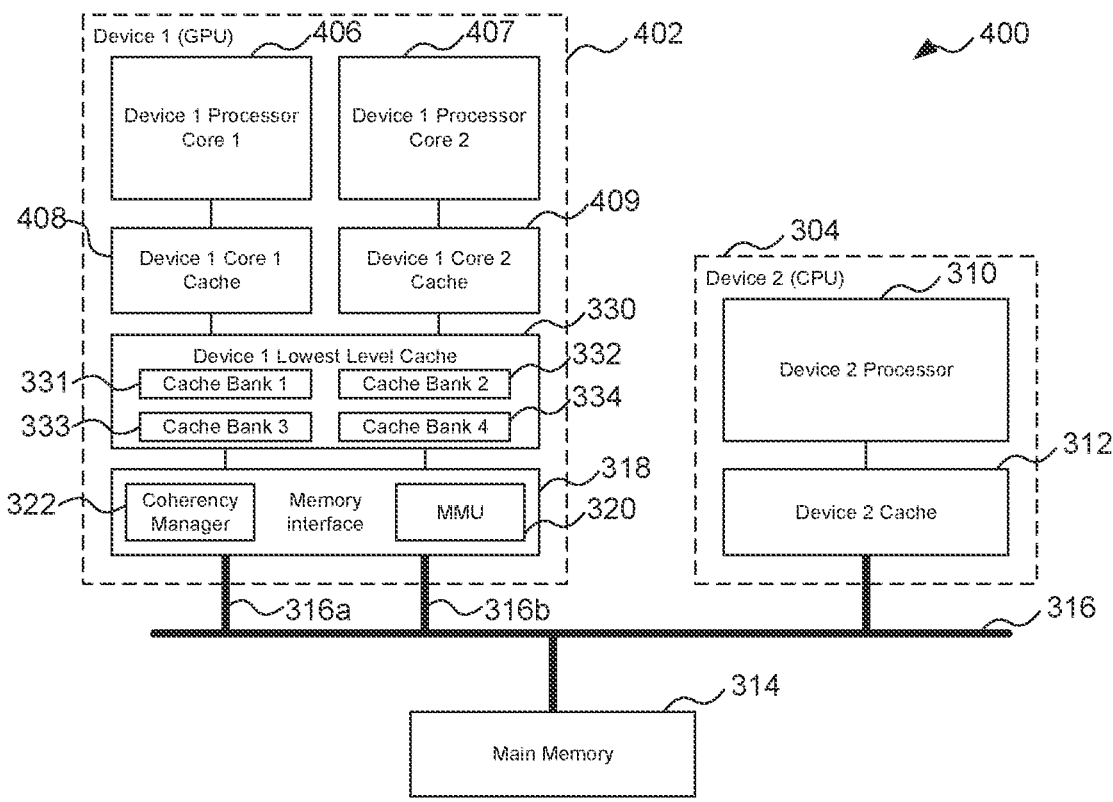
FIG. 4 schematically shows another system comprising multiple processors and multiple caches.

FIG. 4 schematically illustrates another system 400 comprising two devices or masters. The system 400 illustrated in FIG. 4 is similar to the system 300 illustrated in FIG. 3. The same reference numbers have been used to refer to the same elements, and a repetition of the description of these is omitted. The following will describe the differences between the systems of FIGS. 3 and 4. Device 1 402 of FIG. 4 comprises two processor cores: Core 1 406 and Core 2 407. Each processor core 406 407 couples to respective caches 408 409. The Core 1 cache 408 may provide a local cache memory to Core 1 406. The Core 2 cache 409 may provide a local cache memory to Core 2 407. Device 1 402 comprises a lowest-level cache 330, which sits (at least logically) between the Core 1 and Core 2 caches 408 409 and the memory interface 318. The lowest-level cache may comprise a plurality of cache banks. As illustrated, the lowest-level cache 330 comprises cache bank 1 331, cache bank 2 332, cache bank 3 333 and cache bank 4 334. Other numbers of cache banks may be provided.

The cache banks 331 332 333 334 within the lowest-level cache 330 provide separate storage regions in the cache. The separate cache banks within each cache are separately addressable. The cache banks may otherwise be identical. In the example illustrated in FIG. 4, Device 1 402 comprises two processor cores and four cache banks. In other examples, the numbers of processors and cache banks can vary.

The memory bus 316 comprises two access paths 316a and 316b to the memory interface 318. This schematically denotes that there can be a plurality of access paths or channels between the memory bus 316 and Device 1 402 via the memory interface 318. The number of access paths may be the same as or less than the number of cache banks. For example, one access path can couple into each cache bank, or one access path can couple into a plurality of cache banks. This will be further explained with reference to FIG. 5.

Figure 5:
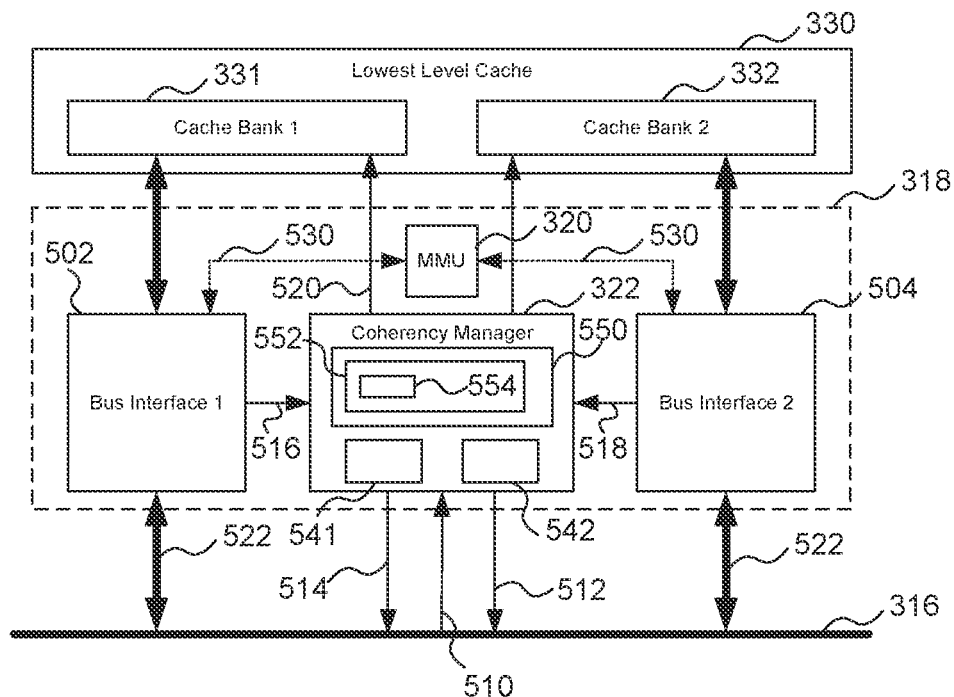
FIG. 5 schematically shows part of the system of FIG. 4.

FIG. 5 schematically shows part of the system 400 as illustrated in FIG. 4, with some additional detail. FIG. 5 illustrates the lowest-level cache 330, the memory interface 318 and the memory bus 316. Here, the lowest-level cache 330 has been shown as comprising two cache banks, cache bank 1 331 and cache bank 2 332. Cache bank 3 333 and cache bank 4 334 are not shown for clarity. Additional cache banks may however be provided in the system illustrated in FIG. 5.

The memory interface 318 is suitably a module within the hierarchy which permits one processor (such as a GPU) to communicate coherently with another processor (such as a CPU). This can mean that the GPU is able to participate as a full cached/coherent master within a coherent bus interconnect, for example within a coherent bus interconnect according to the AXI-ACE protocol.

The memory interface 318 comprises two bus interfaces: bus interface 1 502 and bus interface 2 504. Each bus interface is configured to interface between the memory bus 316 and a portion of cache memory. As illustrated, bus interface 1 interfaces between the bus 316 and cache bank 1 331; bus interface 2 interfaces between the bus 316 and cache bank 2 332. Whilst cache bank 3 333 and cache bank 4 334 are not shown in FIG. 5, bus interface 1 502 could additionally interface between the bus 316 and cache bank 3, and bus interface 2 504 could additionally interface between the bus 316 and cache bank 4. Alternatively, two further bus interfaces could be provided, each arranged to interface into one of cache bank 3 and cache bank 4. Suitably the bus interfaces sit alongside the coherency manager in the memory interface. As well as interfacing between the bus and the cache banks, the bus interfaces couple to the coherency manager 322 and to the MMU 320.

The MMU 320 couples with the bus interfaces 502 504 as schematically illustrated at 530. The MMU is able to translate virtual addresses used by the cache 330 to physical addresses in the physical address space used on the memory bus 316. The bus interfaces are suitably configured to send the virtual address to the MMU and to receive the corresponding physical addresses from the MMU. The bus interfaces can then use those corresponding physical addresses to address transactions sent by the bus interfaces over the memory bus.

The bus interfaces 502 504 may be interface converters, such as AXI converters, associated with the lowest-level cache 330. A cache bank interface can be provided between respective cache banks 331 332 and bus interfaces 502 504 (not shown in FIG. 5). The cache bank interface may be provided as a module separate from the cache, and/or as a module that forms a part of the cache.

In one implementation, the lowest-level cache 330 is configured to make requests to memory over an AMBA 4.0 compliant interface, which includes the Coherency Extensions (commonly known as AXI-ACE). The bus interfaces 502 504 can help ensure compliance with a protocol such as the AXI-ACE protocol. The coherency manager 322 of the memory interface 318 is connected to channels on the bus 316 associated with snoop requests. The channels may comprise a snoop address channel 510, a snoop response channel 512 and an acknowledgement channel 514. Most of the remainder of the channels defined in the AXI protocol specification will be driven directly by the bus interfaces 502 504 associated with the lowest-level cache 330. The bus interfaces 502 504 couple to the coherency manager 322 (illustrated at 516 518) so that the coherency manager can monitor outgoing coherent transactions (such as on the Address Response (AR) interface, for example CleanUnique and ReadUnique transactions) and incoming responses (such as on the read (R) response channel, for example responses to the CleanUnique and ReadUnique transactions), to be able to update the status of coherent cache lines that are being tracked and to drive a read acknowledgement signal ('RACK') 514. The coherency manager 322 can also monitor outgoing coherent transactions on the Address Write (AW) interface (for example writeback and evict transactions), and incoming responses on the write response (B) channel (for example responses to the writeback and evict transactions) to be able to update cache line status and to drive a write acknowledgement signal ('WACK') 514.

The snoop address ('AC') channel 510 is an input to a master device such as a processor 406 at Device 1 402, having an associated cache 330, that provides the address and control information for snoop requests which have been issued to that processor (e.g. the GPU). The memory interface 318 may be able to accept and process different snoop transaction types, for example as defined in the AXI-ACE protocol, as discussed herein.

The snoop response ('CR') channel 512 is an output from a master device such as a processor 406 at Device 1 402, having an associated cache 330, that provides the response to a snoop request which was issued to that processor (e.g. the GPU). Every snoop request on the snoop address channel 510 has a corresponding response on the snoop response channel 512. Responses to a snoop request may comprise one or more of:

indicating whether the snooped cache line was held in a unique state before the snoop request was received,
indicating that the snooped cache is retaining a copy of the cache line,
indicating that the cache line is dirty and responsibility for writing the cache line back to memory is being transferred to the master,
indicating whether the cache line is corrupt, and
indicating if a cache line of data will be transferred.

The snoop response may comprise an indication that the cache line was not present in the cache, that the cache line was present but has been invalidated, or that the cache line was present and a copy of the cache line is being retained.

In scenarios where a snooped cache line is present at the cache 330, the lowest-level cache may either write the cache line back to memory if it was dirty, or simply invalidate it. Thus, by the time a response is sent to the snoop request, the response can indicate that the cache line was present but has been invalidated. An exception may be where a copy of the cache line is retained in the cache after writing it back to memory if dirty, in which case the response can indicate that the cache line was present and a copy of the cache line is being retained.

The ACE extensions include two acknowledge signals used to indicate when a master has completed a Read or Write transaction. These may be asserted almost immediately and not delayed to wait for any other transaction. The memory interface 318 may use the acknowledge signals to ensure that a transaction on a master's snoop address channel 510 in respect of a particular address (or cache line) is not issued until any preceding transaction from the master to the same address (the same cache line) has completed. The memory interface 318 may drive this signal to denote that any state transition associated with a Read or Write transaction completing has been performed and therefore by issuing an acknowledgement, the memory interface 318 is thereby guaranteeing that it will be able to accurately respond to a snoop request for the cache line which has just been updated. The acknowledgements may be issued in the same order as the read/write responses were received.

To enable the memory interface 318 to be able to respond correctly to incoming snoop requests, the memory interface may be configured to monitor internal interfaces and to update cache line status, for example by interacting with the cache banks. The memory interface may also be configured to instruct the cache when to flush and/or invalidate cache lines, for example by a 'flush-invalidate' command 520 generated at the coherency manager 322.

Internal interfaces which the memory interface 318 is configured to monitor comprise:

a command interface permitting issuance of a flush-invalidate command in respect of a specific cache line address,
a flush_active mask permitting the setting and clearing of bits in the mask to enable control of the flush process. For example, when a flush is issued to the cache bank, the cache line to be flushed can be identified by a flush ID, and the bit corresponding to the flush ID can be set high in the flush_active mask; this bit can, however, be cleared before the flush is processed, indicating that the flush for this cache line should be ignored,
a flush_processed bit corresponding to the flush ID can be set high for one cycle when the flush is processed or ignored,
an update interface permitting updating of the cache line state (for example whether it is coherent) when a relevant transaction has completed,
a read channel request interface. The memory interface may be configured to monitor coherent transactions which are to be output on the address read ('AR') interface 522, for example by the bus interfaces 502 504. This permits the memory interface to be able to change cache line states and/or to create new entries in response to outgoing requests,
a spilling mask (or an eviction mask) for indicating which entries of the reverse translation data structure are being spilled. Transactions on the address read bus may be prevented from proceeding to memory if this bit is set, i.e. read transactions should not proceed on an entry in the reverse translation data structure that is being spilled,
an address write (CAW) interface 522. The memory interface may be configured to monitor coherent transactions which are to be output on an address write interface ('writeback/evict' interface), for example by the bus interfaces 502 504. This permits the memory interface to be able to change cache line states in response to outgoing requests,
a mux interface. Once a Writeback and/or Evict transaction is ready to be output, the corresponding reverse translation data structure entry number for the cache line which is being written back and/or evicted may also be output. This allows a combinatorial mux (multiplex) of the appropriate physical address which is stored inside the reverse translation data structure, since this avoids a reliance on the remainder of the memory interface to translate the request and therefore can avoid the remainder of the memory interface needing to perform a Read request in order to respond to a snoop,
a claiming channel response interface. The memory interface may be configured to monitor the claiming channel response interface so as to enable cache line states to be updated, and/or to be able to drive a read acknowledgement signal ('RACK') 514,
a writeback channel response interface. The memory interface may be configured to monitor the writeback channel response interface so as to enable cache line states to be updated, and/or to be able to drive a write acknowledgement signal ('WACK') 514.

The coherency manager comprises two snoop processors: snoop processor 1 541 and snoop processor 2 542. In general, the coherency manager comprises a snoop processor in respect of each bus interface 502 504. Each snoop processor is associated with a respective bus interface. The snoop processors are configured to process snoop requests that are received at the bus interface with which they are associated, as is described in more detail elsewhere herein.

Snoop Processor

Figure 6A:
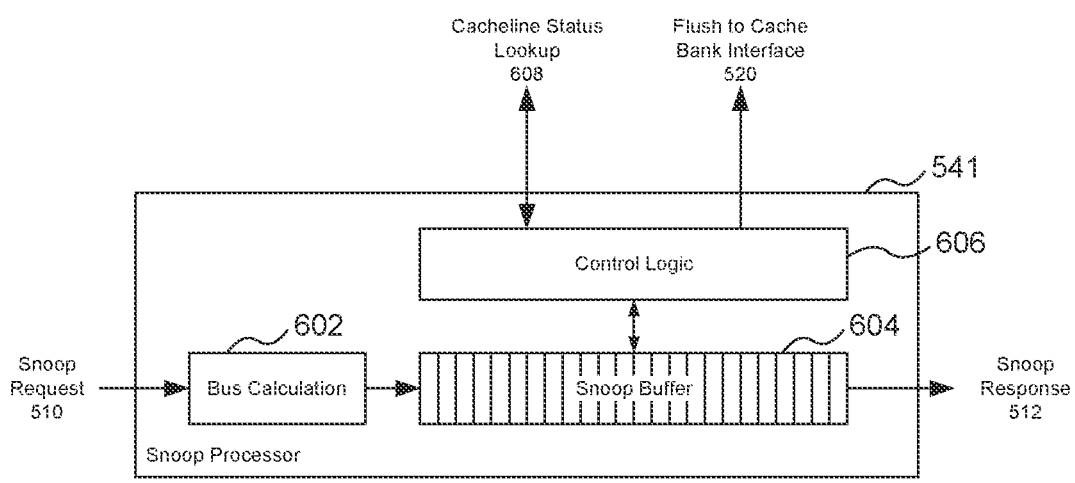
FIG. 6A schematically shows a snoop processor.

Referring to FIG. 6A, the snoop processor 541, 542 is configured to receive a snoop request (such as a snoop request received over the snoop address channel 510). The snoop processor comprises a bus calculation unit 602. The bus calculation unit is configured to calculate whether a received snoop request relates to the bus interface with which the snoop processor is associated (see below). The bus calculation unit 602 is coupled to a buffer (which may be called a snoop buffer) 604. The buffer couples bidirectionally with control logic 606. The control logic controls cacheline status lookup requests and responses 608 and flush commands to the cache 520. The control logic is arranged to issue snoop responses to the snoop response channel 512. One or more pointer may permit snoops contained within the buffer to go through the different stages of processing simultaneously in a pipelined manner. The snoop buffer may be a first in, first out buffer. The buffer may permit requests to be processed out-of-order, but responses to requests to be output in the same order that those requests were received. This will be discussed in more detail elsewhere herein.

When a snoop request is received on the snoop request interface, i.e. over a snoop address channel (AC) 510, the reverse translation data structure entry (for example, a page translation table (PTT) entry) (if any) is looked up. The lookup may be performed by comparing the physical page and protection bit. The entry number, reverse translation data structure hit/miss result and the virtual address are sent to the snoop processor. The snoop processor is instantiated for each AC port and is responsible for processing and responding to the snoop requests received on that port. It implements a FIFO (first in, first out) buffer. The buffer may comprise registers. The buffer may contain snoop requests that are currently being processed, and the current state of processing of those snoop requests. If the buffer is full, then the snoop processor 541 may stall back the corresponding AC interface enable.

It is possible to restrict processing of the received snoop requests to the order in which they are received, but this may be inefficient. Instead, the snoop requests may be processed out-of-order. However, the responses may be sent on the snoop response (CR) channel 512 in the same order in which the snoops were received (for example to satisfy the requirements of an operating protocol, such as the ACE protocol).

Therefore if a snoop is received for address A followed by a snoop for address B, and the snoop process is able to determine that address B is Invalid, the buffer can be updated with the response for address B straight away, but it will only be output on the snoop response bus once the response for address A has been sent.

The buffer 604 is configured to store one or more intermediate response generated in response to the received request. I.e. the buffer can store, in the example above, the response to the snoop for address B. Subsequently, on completion of the snoop request on address A, the snoop processor can store the response to that request in the buffer and/or output the response directly. The snoop processor may be configured to send an output in response to the received request in dependence on the stored one or more intermediate response. For example, the response to the request on address B which is stored in the buffer can be sent once the snoop processor determines that the response to the request on address A has been sent. In this way, the snoop processor can maintain the ordering of the responses to match the expected order, such as the order in which the requests were received.

Figure 6B:
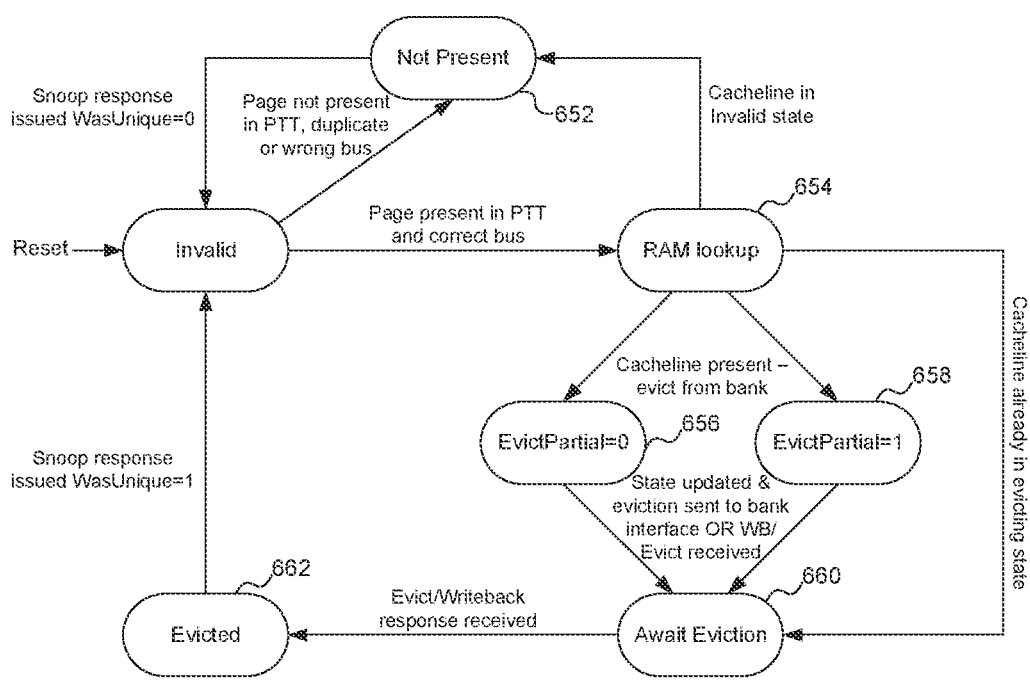
FIG. 6B schematically shows example snoop buffer states.

The states of the snoop buffer will now be described with reference to FIG. 6B.

When a new snoop request is received, an entry is written in the snoop buffer, for example using a write pointer. If the bus interface corresponding to the snooped address is different to the bus interface associated with the snoop processor that receives the snoop request, or the snooped address does not have a matching entry in the reverse translation data structure, the snoop result is Invalid and the state, such as at the current write pointer, is changed to NOT PRESENT 652. Note that the snoop buffer is configured so that a response will still be sent, despite a request being issued to the wrong bus interface and/or a duplicate snoop being issued to the same address. This approach permits the memory interface to handle requests (even requests in error) in a consistent way.

In the example illustrated in FIG. 6B, if the bus interface corresponding to the snooped address matches the bus interface associated with the snoop processor that receives the snoop request, and the snooped address has a matching entry in the reverse translation data structure, the state is changed to RAM LOOKUP 654 and a request is made to the cache line status unit 906 which will subsequently return the state of the snooped cache line. The buffer write pointer may be pipelined alongside the cache line status lookup and used to update the correct buffer entry when the cache line status read data is returned.

When the cache line status read data is returned, the state of the cache line is assessed. If the cache line being snooped is Invalid, the state in the buffer entry may be updated from RAM LOOKUP 654 to NOT PRESENT 652. If, on the other hand, the cache line state is not Invalid, i.e. it is one of UniqueP0, UniqueP1 or Evicting, the buffer entry state is updated to EVICTP0 656, EVICTP1 658 or AWAIT EVICTION 660 respectively. Buffer entries in an EVICTP0 or EVICTP1 state may then be selected, for example by a rotating 'send flush' pointer, and a corresponding flush request issued (for example to the cache bank interface module 910). Once the flush request has been accepted (for example by the cache bank interface module 910), the state is updated to AWAIT EVICTION 660. When in the AWAIT EVICTION state 660, entries are sensitive to incoming Writeback/Evict completions and a matching completion will cause the entry to move to the EVICTED state 662.

In addition, in order to prevent the issuing of a flush request when the cache bank has already evicted the cache line, buffer entries are also sensitive to Writeback/Evict requests. A matching request will cause an entry in an EVICTP0 656 or EVICTP1 658 state (e.g. one that is waiting for its turn to be sent to the cache bank interface 910) or an entry in the RAM LOOKUP state 654 on the cycle where the cache line status read data is returned, to be moved to the AWAIT EVICTION state 660.

Once buffer entries are in a NOT PRESENT 652 or EVICTED 662 state the snoop response can be output. These buffer entries may be selected, for example by a rotating read pointer. The buffer entries may be selected in order. A snoop response is issued on the snoop response (CR) interface 512. In some examples, the response will be either 0x10 (Was Unique=1) for entries in the EVICTED state 662 or 0x0 (Was Unique=0) for entries in the NOT PRESENT state 652. The snoop response may be driven in the same way for all types of snoop request.

Snoop buffer entries may comprise the state, the reverse translation data structure entry number and the cache line offset address (for example a 64-byte address offset within a 4 KB page). The depth of the buffer defines the number of outstanding snoop requests that can be received on the bus before stalling back. The snoop buffer depth may be, for example, set at 8. Suitably, an empty buffer entry is implied by the INVALID state so a separate valid bit is not required.

The memory interface may support configurations with a single set of snoop request/snoop response (AC/CR) ports. The memory interface may support configurations with multiple sets of snoop request/snoop response (AC/CR) ports, where the number of AC/CR ports is the same as the number of other memory ports. I.e., a configuration with two address read/address write (AR/AW) ports and either one or two AC ports is supported. Where there are multiple AC ports it is assumed that the multiple memory buses are treated by the interconnect as separate masters (such as ACE masters), and therefore a snoop issued on one AC port corresponds to requests on a corresponding bus interface.

In configurations with a single AC port, where the single AC port couples with all the bus interfaces (whether 1, 2, 4 etc.), the single snoop processor instance is sensitive to Writeback/Evict requests and responses on all bus interfaces. Logic to determine the correct bus interface corresponding to a snooped address need not be instantiated.

In configurations with multiple AC ports, there may be the same number of AC ports as there are bus interfaces, in which case each AC port couples to a respective bus interface. In other examples, the number of AC ports and bus interfaces may differ. For example, there may be four bus interfaces and two AC ports, with two bus interfaces coupling to each AC port. Other configurations are possible. There may be a snoop processor instance corresponding to each AC port. Each snoop processor instance may be sensitive only to Writeback/Evict requests and responses from the corresponding bus interface or bus interfaces (i.e. the one or more bus interface corresponding to that snoop processor). Logic to determine the correct bus interface corresponding to a snooped address may be instantiated. The logic may be configured to determine the bus interface on which the request (such as the snoop request) is received.

Reverse Translation Module

Referring again to FIG. 5, the coherency manager 322 comprises a reverse translation module 550. The reverse translation module is configured to translate physical addresses into virtual addresses. For example, the reverse translation module is configured to translate a physical address received over the bus 316 into a corresponding virtual address in the virtual address space of the cache 330 at Device 1 402.

The reverse translation module 550 may comprise a reverse translation data structure 552. The reverse translation data structure 552 may comprise a page translation table (PTT) 554. The reverse translation module 550 suitably comprises a register array and associated lookup logic for memory interface ports and the snoop address (AC) port. On receiving a request, such as a memory request associated with a physical address (for example a memory request addressed in a physical address space), the reverse translation module permits the physical address to be translated into a virtual address (for example, the memory request can be translated into a translated memory request addressed in the virtual address space). The virtually-addressed cache can then process the translated request. To maintain compliance with, for example, the AXI protocol, the response to the memory request is converted back into the physical address space (for example by the MMU) before being sent on the physically-addressed bus.

The content of the reverse translation data structure 552 allows the coherency manager 322 to respond to snoops using physical addresses while interfacing with the ACE Converter and lowest-level cache banks using the corresponding virtual addresses. In addition to the virtual and physical address information, each reverse translation data structure entry contains status fields indicating the overall status of the page entry. The status fields may indicate: whether the reverse translation data structure entry is currently in use or can be allocated, whether it is in the process of being spilled (see elsewhere herein), whether the cache lines in use within the page are in states that permit spilling or whether any cache lines within the table are in a state for which a snoop request would be responded to as having ownership of the cacheline. The snoop response can be determined without having to look up the individual cache line states, or the cache lines, as will be explained elsewhere herein.

Figure 7:
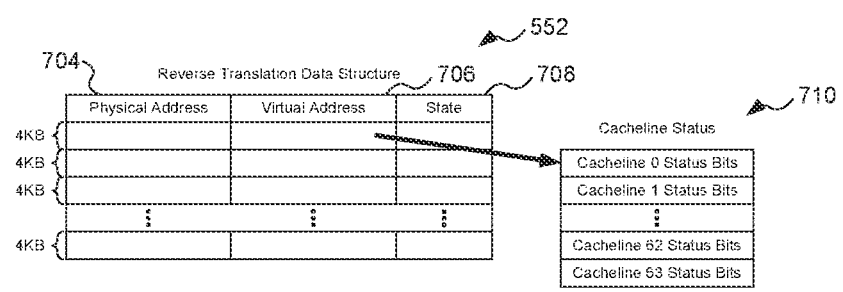
FIG. 7 schematically shows a reverse translation data structure and cache line status data structure.

In more detail, with reference to FIG. 7, the reverse translation data structure 552 comprises a PTT which may be a fully-associative table containing the 4 KB pages within which cache lines are being tracked by the memory interface. Together, these pages may represent all the coherent pages currently contained in the lowest-level cache banks or with requests in flight within the ACE Converters, with the exception of new cache line allocations the memory interface (or, for example, the coherency manager at the memory interface) is not yet aware of. In other words, the reverse translation data structure 552 only stores reverse translation information for the coherent cache lines currently held in the cache memory. This is because the reverse translation only needs to be performed for coherent cache lines, and not for the whole physical address space. This reduces the amount of data that is held at the reverse translation data structure 552. Each PTT entry (or more generally, a reverse translation data structure entry) contains the physical address 704 and virtual address 706 of the physical and virtual pages. This permits the memory interface 318 to respond to snoop requests which use physical addresses whilst interfacing with portions of the system, e.g. the master-slave system (with multiple master and slave devices), such as the lowest-level cache 330, using the corresponding virtual addresses. Particular cache lines may be addressed more specifically by using an offset within the relevant page. Where the virtual and physical pages are each aligned along the same page boundaries, for example where both virtual and physical pages are 4 KB-aligned, the offsets for a given cache line may be the same within the virtual page as within the physical page. This can simplify the reverse translation.

Each reverse translation data structure entry may also comprise a prot ("protection"; security indicator) bit and Context/PASID (or Process Address Space ID). More generally, any value may be provided for or in place of the Context/PASID. 'Context' is relevant to an independent address space, which in CPU terminology is often called the PASID, which refers to processor designs where each application/process is typically allocated a new independent address space, which means it will have its own set of translation tables such as MMU translation tables. The Context/PASID value may comprise an identifier that can be associated with a process, and with a page table such as the PTT, or with the virtual address within the page table.

The reverse translation data structure may comprise a state field 708 for storing the state of the mapping between physical and virtual pages. The state field may comprise a flag for asserting that the mapping between the physical address 704 and the corresponding virtual address 706 is valid. The mapping may be valid where the virtual page in the cache comprises valid data associated with the physical page in main memory. The assertion of the flag in the state field may indicate that the mapping of each cache line in the physical page is validly mapped to each cache line in the virtual page. The assertion of the flag in the state field may indicate that the mapping of at least one cache line in the physical page is validly mapped to the respective cache line in the virtual page. Suitably, the state field flag is not asserted where none of the cache lines in the physical page validly map to cache lines in the virtual page. Thus, where the state field flag is not asserted, the coherency manager can determine that none of the data stored in the cache lines at the cache is valid. There is no need to access the cache to make this determination. Thus the coherency manager 322 can, in this case, determine that a cache line is not valid without needing to access the cache itself. In some examples, the state field 708 can comprise additional information or data.

Suitably, the reverse translation data structure 552 is associated with a cache line status data structure 710. The cache line status data structure may be a directory. The reverse translation data structure may comprise the cache line status data structure. The cache line status data structure may be provided separately from the reverse translation data structure. The cache line status data structure may be provided together with, or as part of, the cache 330. Preferably, however, the cache line data structure is provided at the memory interface 318, for example at the coherency manager 322. The coherency manager is arranged to access the cache line status data structure. The cache line status data structure comprises status indicators for at least one cache line that is being tracked in a page mapped by the reverse translation data structure. The cache line status data structure may indicate a state of the cache line, as described above, for example whether that cache line is 'valid', 'invalid', 'clean', 'dirty', whether data at that cache line is being written back to main memory (a cache line may be indicated to be invalid in this state), whether data at that cache line is being evicted from the cache (a cache line may be indicated to be invalid in this state), and so on.

Suitably the coherency manager, for example the snoop processor at the coherency manager, is configured to query the cache line status data structure 710. Suitably querying the cache line status data structure comprises determining, from the cache line status data structure, for example from entries contained within data fields at the cache line status data structure, a state of a particular cache line at the cache memory. The particular cache line is suitably the cache line associated with, or corresponding to, a physical memory address identified in a snoop request. I.e. the particular cache line is suitably the cache line that stores (for example where the cache memory owns the relevant cache line), or would store (if the cache memory owned the relevant cache line), data corresponding to the location in memory identified by the physical memory address.

The cache line status data structure may be provided in a separate RAM. Suitably the cache line status data structure, for example the RAM, is located at Device 1 402. For example, the cache line status data structure may be connected to, or may form part of, the lowest-level cache 330 at Device 1. Suitably the RAM is coupled (or connected) to the lowest-level cache, for example being provided on a data path adjacent the lowest-level cache. Suitably the RAM is coupled (or connected) to a respective cache bank. The RAM is configured to store the status of cache lines that are stored the respective cache bank. This will be discussed in more detail below.

In some implementations, when a determination is made that the desired data is present in a cache line at the cache, the status of that cache line is determined from the cache line status data structure (such as one stored in the RAM). This determination of the status of the cache line can be done without needing to access the cache line and/or the cache (or cache bank) at which that cache line data is stored.

The reverse translation data structure can be scaled to obtain a trade-off between area and capacity in terms of the maximum concurrent number of coherent pages which can be tracked inside the lowest-level cache at any time.

Reverse Translation Data Structure Entries

The reverse translation data structure can be used to track coherent cache lines in the following way. When a virtual address and 4 KB-aligned physical address (and optionally Context/PASID) are presented on an interface of the coherency manager, for example where the coherency manager monitors an outgoing request from a processor to the main memory, the coherency manager looks up the physical address and prot bit in the reverse translation data structure, for example in the PTT. If the incoming address/prot bit does not match an existing entry which is in use within the reverse translation data structure, the coherency manager suitably allocates a currently invalid reverse translation data structure entry (such as a PTT entry) with no outstanding requests claiming that entry. If no such Invalid entries currently exist, the request will be stalled at the coherency manager until an entry becomes free. Entries are suitably allocated on a round-robin basis between multiple inputs at the coherency manager (for example inputs from multiple bus interfaces 502 504).

For write requests presented on an interface of the coherency manager, the virtual page and Context/PASID are compared to find the matching entry and again only entries that are in use (i.e. in an active state or with outstanding requests on that entry) are considered in the matching criteria. The check for an in-use entry in the reverse translation data structure hit criteria prevents hitting on stale entries where the virtual to physical address mapping may have changed.

The coherency manager is configured to output the physical page on the Writeback/Evict channel, in response to the virtual page and Context/PASID. Thus, the virtual page and Context/PASID are suitably in the reverse translation data structure registers as well as the physical address. Without this requirement it would still be possible to look up the RAM entry based solely on the physical address and protection (prot) bit.

The reverse translation data structure 552 (or PTT 554) may comprise the following fields per entry.

- a 'state' field, indicating the overall state of the entry,
- a 'spilling' field, indicating whether the entry is undergoing spilling,
- a 'request counter' field, indicating the number of outstanding ReadUnique and/or CleanUnique requests on cache lines within the page,
- a 'valid counter' field, indicating the number of cache lines in a non-invalid state,
- a 'Vpage' field, comprising a virtual 4 KB page,
- a 'Context/PASID' field, comprising the Context or PASID,
- a 'page' field, comprising a physical 4 KB page, and a 'prot' field, comprising the protection bit, indicating a secure address space for the physical page.

The state field of each entry in the reverse translation data structure can be in one of two states: an 'Invalid' state and an 'Active' state. These states indicate whether the entry is free to be assigned to a new page mapping, whether it is a potential candidate for spilling, and/or whether it is worth reading the cache line status from the status data structure, e.g. from the RAM, on a snoop.

When in the Invalid state, the entry contains only Invalid cache lines, and if there are no claiming or reading requests outstanding on any of these cache lines as indicated in the request counter field, it is free to have a new mapping between physical and virtual pages assigned to it. Once the entry is assigned to a new page and/or a ReadUnique or CleanUnique request is received for the currently assigned page, the request counter field is updated (for example a counter can be incremented) to prevent the entry from being re-assigned prior to moving to the Active state. The entry moves to the Active state once a ReadUnique or CleanUnique response is received for a cache line in that entry. If a snoop is received on a cache line whose entry is in the Invalid state, there is no need to read the cache line status from the cache line status data structure as it is also in the Invalid state. Thus a response to the snoop can be provided without having to access the cache line status data structure. Avoiding this step can lead to a reduction in bandwidth and/or latency.

An entry in the Active state contains cache lines which may not be Invalid. I.e. cache lines that may be in a Unique or Evicting state. When in this state an entry can be selected for spilling if the request counter field indicates that no requests are outstanding. If, upon reading the cache line status data structure, it is determined that all cache lines have returned to the Invalid state then there is no need for spilling to take place and the entry itself moves to the Invalid state. Once spilling completes, if all cache lines were evicted and returned to the Invalid state then the entry becomes Invalid. If the spill was aborted early so that not all the cache lines were evicted and remain in a Unique state, then the entry remains in the Active state. If a snoop is received for a cache line whose entry is in the Active state, the cache line status data structure is read in order to find the current state of the cache line. This state can be passed to a spill control unit and/or to a snoop processor within the memory interface. The memory interface can process an incoming request on the basis of the state of the cache line.

Note that the request counter field and the valid counter field may each comprise a counter. For example, the request counter can count outstanding ReadUnique and CleanUnique requests on cache lines in the page. The counter can be incremented when a read request is received on a request interface, and decremented when a response is received on the interface. When the request counter is not zero (i.e. there is at least one outstanding request), the reverse translation data structure entry cannot be spilled. Providing a counter in this way may improve power-efficiency and/or reduce contention between ports compared to storing idle/active bits in the status data structure. For example, this approach can permit a reduction in the number of state transitions in the cache line status data structure. The valid counter can count the number of cache lines in a non-Invalid state in the page. Reverse translation data structure entries with a non-zero valid counter are candidates to be spilled. Spilling can be considered to be complete when the value of the counter reduces to zero.

In one example, the lowest-level cache may be a 256 KB cache, with 64-byte cache lines, giving a total number of 4096 cache lines. If all possible cache lines within a page were present at any one time, this would only require 64 entries, but since, in practice, cache lines would not fully populate each 4 KB page, a greater number of entries (e.g. 92-128 entries) is likely to be needed to avoid constant spilling. The number of entries may be 96, which provides an appropriate balance between storage space required (taking up silicon area) and being able to store sufficient entries to permit smooth operation of the system.

Spilling

The cache 330 has a finite size. Likewise the reverse translation data structure 552 has a finite size. Therefore it will be appropriate to monitor the fill level, such as of the cache and/or of the reverse translation data structure, to ensure smooth operation of the system. If there are sufficient coherent pages in use within the system, the reverse translation data structure will eventually become full. In order to make space for new coherent pages the data structure may therefore be able to evict existing entries: this is called spilling. Spilling may involve selecting entries and instructing the cache banks to flush/invalidate the cache lines tracked within those entries, and then moving the entries back to an Invalid state once all contained cache lines have been evicted and their corresponding Writeback/Evict responses have been received. This allows those entries in the data structure to be reused for new cache lines.

Rather than wait until the data structure is completely full before spilling commences (which would potentially cause long periods of stalling while entries were cleared), the memory interface may be configured to pre-emptively begin spilling entries in the data structure once the remaining number of free entries reaches a threshold value. Once this threshold is reached, a specified number of entries will be spilled in turn. Both the threshold and the specified number of entries to spill once the threshold is reached are configurable through configuration registers.

The memory interface 318 may be configured to determine a fill level threshold. The fill level threshold may comprise a cache fill level threshold and/or a reverse translation data structure fill level threshold. The fill level threshold may be predetermined. The fill level threshold may be varied in response to system operation. The fill level threshold is suitably less than a maximum fill level (i.e. a maximum fill level of the cache and/or a maximum fill level of the reverse translation data structure). For example, the fill level threshold may be up to 90% of the maximum fill level, and may be up to 80% of the maximum fill level. In some examples the fill level threshold is 75% of the maximum fill level. The fill level threshold can be selected by a program running at the processor and/or by a user of the system (for example by modifying a corresponding value in a system configuration file).

When the fill level of the cache and/or of the reverse translation data structure reaches the fill level threshold, the coherency manager 332 may be configured to commence a spilling process. In a spilling process, cache line data is evicted or flushed from the cache. This process may continue until the determined fill level reduces below the fill level threshold, until data in a particular number of cache lines has been evicted or until the coherency manager determines that the spilling process should stop. For example, a value for the number of cache lines to evict (or to try to evict) can be provided. This value, an "evict amount" value, may be stored in or associated with the coherency manager. The evict amount value may be configurable, for example user-configurable. Thus, where a threshold is reached that causes the spilling or eviction process to start, the coherency manager may be configured to evict a number of cache lines corresponding to the evict amount value. In some examples, there may be a hysteresis in the spilling process, such that the spilling starts when the fill level threshold is reached, but does not stop until a second threshold, lower than the fill level threshold is reached. For example, spilling may start when the fill level reaches or exceeds a fill level threshold of 75% of the maximum fill level, and will stop when the fill level reduces to or beyond a second threshold of, say, 60% of the maximum fill level. This hysteresis may reduce the spilling process frequently starting and stopping as the fill level threshold is reached.

As cache line data is evicted from the cache in the spilling process, and corresponding entries in the reverse translation data structure are deleted or invalidated, space is freed up for new entries in the cache and the reverse translation data structure. New entries may still be written during the spilling process.

Candidate entries for spilling are those which are not currently being spilled and have a zero request counter and non-zero valid counter. Entries in the cache and/or the reverse translation data structure may be selected for spilling based on an eviction criterion. The eviction criterion may comprise one or more of an age of data in a cache line, a frequency of access of a cache line, a number of accesses of a cache line, a last-accessed time of a cache line and a random selection of a cache line. Other ways of selecting the most appropriate cache line data to evict will be clear to the skilled person. The particular way in which the cache line data to evict is selected may depend on the system, the program running at the processor, and so on.

The memory interface, or the coherency manager at the memory interface, may be configured to determine whether there is an outstanding transaction (such as a read request) on a cache line, and only to select cache line data for eviction when it is determined that there are no outstanding transactions on that cache line.

Once spilling has begun, candidate entries are selected in turn and read from the cache line status RAM. If the entry still contains Unique cache lines the spilling status bit is set against the entry and flushes are issued to the cache banks via the cache bank interface. Once the specified number of entries, for example as specified by a register, have undergone this process, or the required data structure space is reached through cache line evictions, the current spilling process ends, otherwise another data structure entry is selected. Once all cache lines in a spilled entry have been evicted and their responses received, the spilling bit is cleared and the entry can be re-used.

Thus, once the remaining number of available entries in the reverse translation data structure 552 (for example a PTT) at the coherency manager 322 reaches a predefined threshold, the memory interface 318 is configured to start instructing the cache banks 331 332 to evict cache line data in order to free up more available entries. The threshold of remaining space in the data structure 552 and the number of entries that will be freed up once that threshold is reached may be defined in one or more spilling control register, which may be implemented at a spilling control unit as discussed in more detail below. The spilling control register may comprise a spill_threshold register which defines the fill level threshold, i.e. the remaining space threshold at which the memory interface starts spilling entries from the reverse translation data structure. In one example, the spill_threshold register comprises an 8-bit value, although other size values are possible. In one example, the default value for the spill_threshold register entry may be 16. The spilling control register may comprise a spill_amount register which defines the amount of entries to spill once the threshold has been reached. In one example, the spill_amount register comprises an 8-bit value, although other size values are possible. In one example, the default value for the spill_amount register entry may be 4.

The memory interface 318 may provide one or more status register permitting performance analysis. The coherency manager 322 may provide the one or more status register. For example, the status register can comprise a status_spilling register to indicate whether the spill control module is actively spilling cache lines from the memory interface.

The status register may comprise a status_spill_entries register to indicate the number of reverse translation data structure entries which are undergoing spilling. The entries indicated to be undergoing spilling are entries for which the memory interface has issued flushes, or is in the process of issuing flushes, for each active cache line and are in a state of waiting for all such cache lines to be written back to memory prior to being available for re-allocation. An address read (AR) transaction from the reverse translation data structure (for example the translation table) on any of these entries will cause the memory interface to stall.

The status register may comprise a status_active_entries register to indicate the number of data structure (e.g. translation table) entries in an active state, i.e. with one or more cache line in a non-invalid state. This gives an indication of the fullness of the data structure.

The status register may comprise a status_snoop_count register to indicate the number of outstanding snoops from the snoop address (AC) channel 510 which are being processed within the memory interface.

Cache Line Lifecycle

The memory interface 318 is configured to track cache lines within the cache 330 that are coherent such that it is able to respond to snoop requests issued by the bus 316 in the eventuality that another master tries to access these same addresses at some point in time. The typical lifecycle of a cache line is schematically illustrated in FIG. 8.

It is useful to introduce some types of transaction. A ReadUnique transaction on a memory line invalidates all other copies of that memory line in other caches (i.e. all other cache lines relating to that memory line in the coherent system) and reads the memory line from memory. Thus the ReadUnique transaction acts to claim ownership of the relevant cache line. A CleanUnique transaction is similar to the ReadUnique transaction, but can be used where a read of the memory line is not necessary, i.e. where the cache at the master already has a copy of the memory line in a cache line. This transaction ensures that if the cache line at the master is dirty, a copy of the cache line data is written back to the main memory. This transaction further ensures that all other copies of the cache line (i.e. copies of the memory line in other caches in the coherent system) are invalidated.

Figure 8:
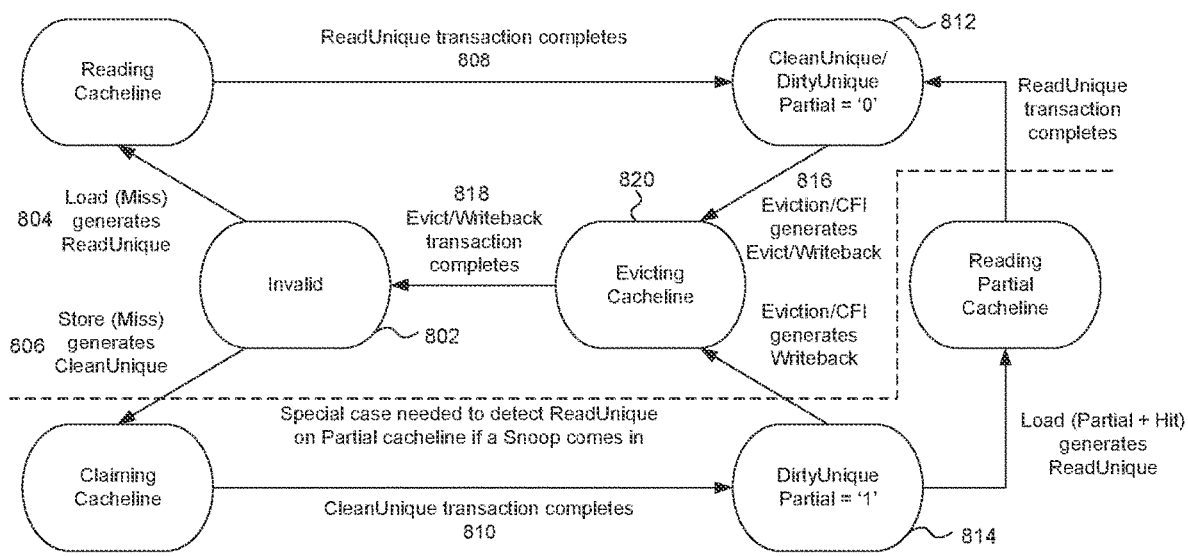
FIG. 8 schematically shows example cache line states.

Referring to FIG. 8, initially all cache lines tracked by the memory interface 318 will start in an invalid state 802. Once the lowest-level cache 330 issues a ReadUnique transaction 804 or a CleanUnique transaction 806, then the cache line can be considered to have entered a transient state whereby a transaction is pending on the bus 316 which will eventually claim the cache line into a Unique state where it is only present inside that cache. It is worth noting however that until this request completes, the lowest-level cache 330 will continue to respond to a snoop as though the cache line is not present because, from the system point of view, the cache does not own the cache line until its bus transaction is processed and responded to by the interconnect. Therefore any snoop request received by the lowest-level cache in the intervening time period can be considered to be ordered before the lowest-level cache's own request.

Once the response to the transaction is received by the lowest-level cache 808 810, this is used to update the status of the cache line at the memory interface so that it is now considered as being owned by the lowest-level cache. Once this state change has been recorded, the memory interface is configured to issue the respective Read/Write acknowledge signal on the ACE interface 514 in order to denote to the interconnect that it is now safe to issue a snoop request to the lowest-level cache for the same physical address because the lowest-level cache will now correctly respond that it owns that particular cache line.

From one of the CleanUnique 812 or DirtyUnique 814 states a cache line may be evicted via an Evict or Writeback process or transaction 816. In common with other transaction types, a cache line will only return to the Invalid or Idle state 802 once the respective transaction completes 818 on the bus. Further, whilst a cache eviction could happen naturally due to the internal cache requests, this is also highly desirable behaviour for the coherency scheme to work, since an incoming snoop request which detects a cache line in a CleanUnique or DirtyUnique state may then issue a request to the lowest-level cache bank in question in order to forcefully evict the cache line (which will include writing back the data if it is currently dirty). In this manner, responding to a snoop request may cause a cache line to be forced into an Evicting Cacheline state 820, and the snoop response cannot be returned until the transaction completes 818 and the cache line returns to an Invalid state 802, otherwise the interconnect may not have accepted any dirty data flushed by the cache by that stage.

As discussed above, the lowest-level cache is a Virtually-Indexed and Virtually-Tagged (VIVT) cache, i.e. a cache addressed in a virtual memory space. However incoming snoop requests from the ACE protocol (for example on the snoop address channels 510) will always be supplied with a physical address, so these are converted to virtual addresses to permit flushes to be issued for a particular cache line to the lowest-level cache banks. To do this, the memory interface 318 is configured to maintain a mapping from physical to virtual addresses, for example a table of physical to virtual address mappings. Suitably the reverse translation data structure 552 comprises the table of physical to virtual address mappings. The physical to virtual address mapping may be done at page granularity or at cache line granularity. In one example, the memory interface (or, for example, a MMU at the memory interface) has a minimum granularity of 4 KB. It is anticipated that variables or data which are coherent between the CPU and GPU will be within the same buffer. There is thus a high probability of data locality. The use of a 4 KB granularity therefore allows a much smaller number of reverse translation data structure entries to cover a much larger address space. Thus operating at a granularity of 4 KB, or indeed any other granularity larger than the minimum, helps make this approach much less expensive to implement.

In one implementation, the memory interface, for example the reverse translation data structure at the memory interface, comprises a fully-associative table of 4 KB aligned virtual addresses (Vpages) and the corresponding mapping to physical addresses (Ppages). The table can be scaled to contain a variable number of entries to trade-off area against capacity in terms of the maximum concurrent number of coherent 4 KB pages which can be tracked by the memory interface inside the lowest-level cache at any one point in time. Augmenting this table of address mappings is one or more cache line status data structure, such as a RAM, containing the status of the individual cache lines within the 4 KB page. This can be used to check an individual cache line address once the table has confirmed whether the particular 4 KB page is being tracked.

Within a 4 KB page, individual 64-byte cache lines are tracked (although other length cache lines could also be tracked) via individual state encodings. A state encoding may comprise a finite state machine (FSM) or one or more state bits. The state encodings may be stored inside the RAM. This enables the total number of flops required in, for example, the coherency manager to be reduced. Each time the status of a cache line changes, the field within the RAM corresponding to the given cache line may be updated to ensure that the coherency manager can correctly decide how to respond to a subsequent snoop request to the same address. In one implementation, the RAM may be split into several instances, enabling a reduction in RAM access power and an increase in the ability to access multiple entries in parallel. A further enhancement may be provided by implementing a L0 cache of recently used entries in registers.

Memory Interface Architecture

Figure 9:
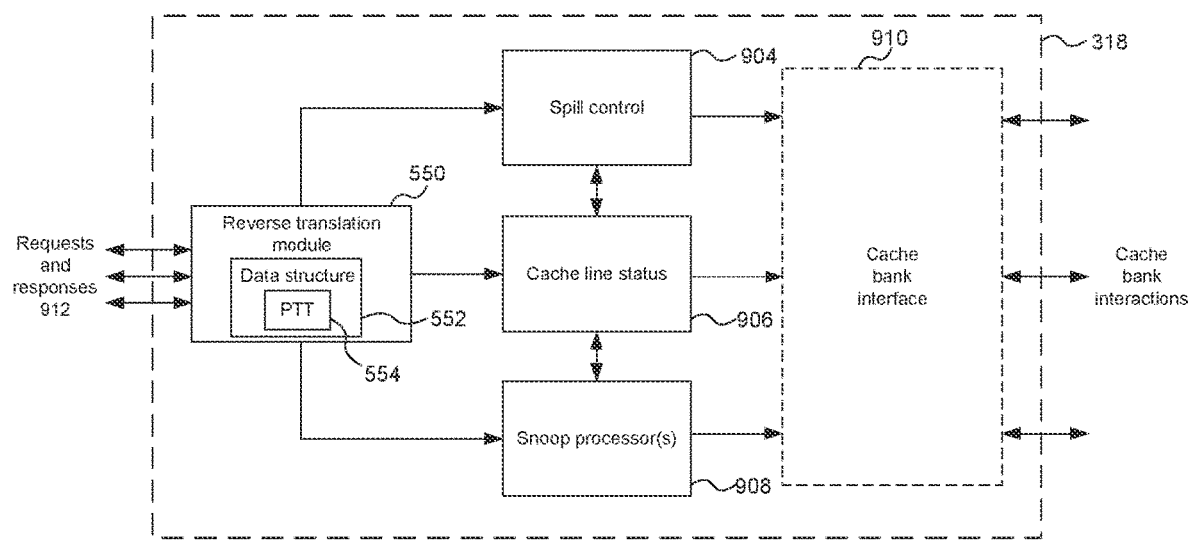
FIG. 9 schematically shows components of a memory interface.

An example of a portion of the architecture of the memory interface 318 and associated systems will now be described with reference to FIG. 9.

The memory interface 318 comprises a reverse translation module 550 having a reverse translation data structure 552, which in the illustrated example comprises a page translation table (PTT) 554. The reverse translation module 550 is coupled to a spill control unit 904, a cache line status unit 906 (which may comprise, or have access to, the cache line status data structure) and a snoop processor unit 908. The spill control unit 904 is coupled to the cache line status unit 906. The cache line status unit 906 is coupled to the snoop processor unit 908. The memory interface 318 optionally also comprises a cache bank interface 910 (the cache bank interface 910 may interface with each cache bank or it may comprise a plurality of cache bank interface modules, each for interfacing with at least one cache bank). The cache bank interface 910 is coupled to the spill control unit 904 and to the snoop processor unit 908. The cache bank interface 910 can also be coupled to the cache line status unit 906. Where the cache bank interface 910 is not provided at the memory interface 318 (for example because the cache comprises one or more interface modules for interfacing with the cache banks), the spill control unit 904, the cache line status unit 906 and the snoop processor unit 908 can each couple directly with the cache.

The spill control unit 904 is configured to initiate and coordinate spilling operations. It is configured to monitor incoming Writeback/Evict requests. The cache line status unit 906 is configured to store cache line states on a per-cache line granularity, optionally in multiple cache line status data structure instances, with crossbar and arbitration logic between inputs and the cache line status data structure instances. The cache line status data structure instances may be RAM instances. The snoop processor unit 908 comprises a snoop processor instantiation for each snoop address (AC) channel. For example, as illustrated in FIG. 5, the coherency manager 322 at the memory interface 318 may comprise two snoop processor instantiations 541 542, one for each of the bus interfaces 502 504. Each snoop processor is configured to process snoops (snoop requests) and to issue responses on the snoop response (CR) interface 512. The snoop processor unit 908 is configured to monitor incoming Writeback/Evict requests and responses. The coherency manager 322 (optionally at the cache bank interface 910) is configured to issue flush commands 520 to the cache banks 331 332 in dependence on signals generated at the spill control unit 904 and the snoop processor unit 908. Where present, the cache bank interface 910 is configured to receive the signals from the spill control unit 904 and the snoop processor unit 908, and to issue the flush commands on behalf of the spill control unit and the snoop processors. Where present, the cache bank interface 910 may be configured to monitor incoming Writeback/Evict requests.

Cache Line Status Unit

The cache line status unit 906 will now be discussed in more detail. Cache line states of the cache lines being tracked by the reverse translation module, for example at the reverse translation data structure, can be stored in one or more cache line status data structure instance. In one example there are four cache line status data structure or RAM instances. Each cache line status data structure may comprise a single port. In the example of a system using 4 KB pages for each reverse translation data structure entry, and a 64-byte cache line size, each of the four cache line status data structures is configured to hold the states of 16 of the 64 cache line offset addresses that exist within the 4 KB page. In another example of a system using 4 KB pages, where there are four cache line status data structure instances and the cache line size is 128 bytes, each cache line status data structure is configured to hold the states of 8 of the 32 cache line offset addresses. Each reverse translation data structure entry may directly point to the corresponding address in the cache line status data structure instances. The provision of multiple cache line status data structure instances permits the states of multiple cache lines in any reverse translation data structure entries to be accessed concurrently by different inputs.

In this example, the required throughput for up to two sets of bus interfaces is expected to be obtained by providing four cache line status data structures, for example four RAMs. For configurations with a higher number of bus interfaces, additional parallel RAM instances are provided so as to achieve the required throughput, although additional RAMs will not be necessary in all cases. For example, an implementation using four bus interfaces can comprise four or eight RAM instances. Other numbers of RAM instances can be selected as desired. In a practical implementation, the choice of the number of RAM instances may depend, inter alia, on the results of performance testing.

Figure 10:
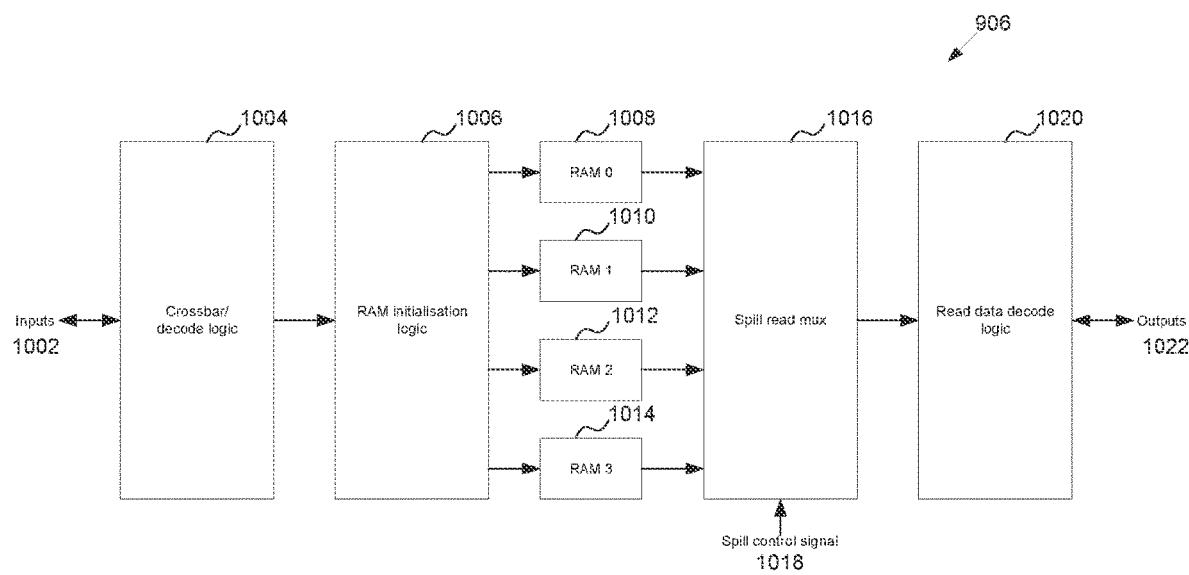
FIG. 10 schematically shows a cache line status module architecture.

A schematic illustration of the cache line status unit 906 architecture is shown in FIG. 10. Crossbar/decode logic 1004 receives inputs 1002 (discussed below). The crossbar/decode logic couples to RAM initialisation logic 1006 which couples to four RAM instances 1008, 1010, 1012, 1014: RAM 0, RAM 1, RAM 2 and RAM 3. The four RAM instances couple to a spill read mux 1016, which is configured to receive a spill control signal 1018. The spill read mux 1016 couples to read data decode logic 1020 which is configured to provide outputs 1022.

The inputs 1002 to the cache line status unit can comprise:
a coherent read response, which can cause the write of the state of a particular cache line, for example that the cache line is in a CleanUnique state;
a Writeback/Evict request, which can cause the write of the state of a particular cache line, for example that the cache line is in an Evicting state (i.e. that the cache line is in the process of being evicted, but that the eviction has not yet completed);
a coherent Writeback/Evict response, which can cause the write of the state of a particular cache line, for example that the cache line is in an Invalid state;
a snoop read and/or a snoop write, permitting each snoop processor (or snoop processor module) to read and/or write the state of a particular cache line.

The spill control unit 904 is configured to provide inputs to the cache line status unit 906. The inputs 1002 comprise a spill control write from the spill control unit 904. The signal input to the spill read mux 1016 comprises a spill control read provided by the spill control unit 904. The coupling of the spill control unit to the cache line status unit permits the spill control unit 904 to be able to read the state of all cache lines within a particular reverse translation data structure entry, and to be able to write the state of a particular cache line.

Suitably, each of the cache line states requires 2 bits. Thus, each of the four RAM instances is 32 bits wide. The depth of each of the RAM instances suitably corresponds to the number of reverse translation data structure entries.

The crossbar/decode logic 1004 is configured to decode accesses on all inputs to determine the correct RAM (or more generally the correct cache line status data structure) instance to which to direct the access (except spill control reads, which access all RAM instances). Accesses are mapped to the four RAM instances using the two least significant bits (LSBs) of the cache line offset. An assumption may be made that similar cache line addresses are likely to be received around the same time (e.g. when a large burst is split across cache banks). Therefore, the first RAM instance 1008 may contain the state of cache line offsets 0, 4, 8, etc. (for a four RAM configuration) and the second RAM instance 1010 contains the state of cache line offsets 1, 5, 9, etc. More generally, the states of cache line offsets can sequentially be contained in a plurality of RAM instances, with states for a number of cache line offsets greater than the number of RAMs cycling through the available RAM instances. This configuration permits parallel access to adjacent cache line addresses. The crossbar decode logic 1004 drives the inputs to arbiters for each RAM instance.

After reset, all locations in the RAM instances may be initialised to an Invalid state. Initialisation logic 1006 performs this operation after reset by writing zeros to each location in the RAM instances. These writes are multiplexed into the arbiter inputs, and all other inputs are held off during the initialisation. Input accesses from the crossbar/decode logic 1004 are arbitrated for each RAM instance. Reads and writes are arbitrated separately using, for example, round-robin arbitration with equal priority to all inputs. Writes may be prioritised over reads to ensure that if a read and a write to the same cache line occur on the same cycle, the accesses happen in the correct order so that the read picks up the changes made by the write. The arbiter is also responsible for creating a full write mask for the RAM access according to the input cache line offset, so that only the state for the specific cache line need be written to.

Reads from the spill control unit 904 read the state of all cache lines in a reverse translation data structure entry and therefore require access to all RAM instances. To synchronise the read of all four RAMs and ensure the return data from all four RAMs can be returned to the spill control unit at the same time while avoiding the need for an enable path back through the RAM pipeline to the arbiter, these reads are multiplexed in after the arbiters when there are no requests from the arbiters to any RAM instances.

The RAM instances, which may be single-port RAM instances, contain a registered pipeline through which sideband data is passed for read requests. This sideband includes a field to identify the source of the read request, the cache line offset and a pointer which is used by the snoop processors to write the state data they receive into the correct location in their internal buffers.

In one implementation, only one RAM instance can output read data for a particular source in each clock cycle. This may be because there is no enable path back through the RAM and arbiters and accesses from a particular source are synchronised. The read data decode logic 1020 determines the correct output to drive with available RAM read data using an ID field passed through the RAM instance pipelines. The pipelined cache line offset is used to mux the correct bits from the RAM read data for the requested state, and return it to the requester.

Figure 11:
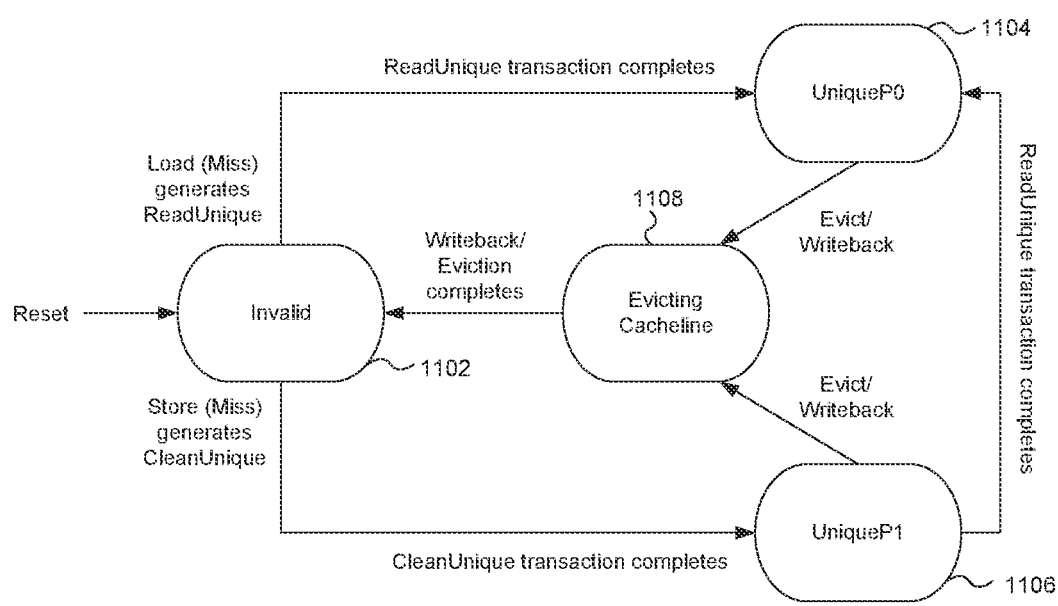
FIG. 11 schematically shows another example of cache line states.

Each state of the cache line can be encoded as a four-state state machine. The states may comprise an 'Invalid' state, a 'UniqueP0' state, a 'UniqueP1' state and an 'Evicting' state, as illustrated in FIG. 11. Each of the cache line states may require 2 bits to encode the four states. Thus, each of the four RAM instances is 32 bits wide. The depth of each of the RAM instances corresponds to the number of reverse translation data structure entries.

The Invalid state 1102 occurs when the cache line has not yet been claimed for unique ownership by the GPU. This can occur following a reset. The cache line may move to the UniqueP0 state 1104 or UniqueP1 state 1106 when a ReadUnique or CleanUnique response, respectively, is received.

In the UniqueP0 state 1104, the cache line is uniquely held by the GPU and is fully valid (i.e. Partial=0: 'P0'). A cache line can be said to be fully valid where the whole of the data stored in that cache line is valid. In the UniqueP1 state 1106, the cache line is uniquely held by the GPU and is partially valid (Partial=1: 'P1'). A cache line can be said to be partially valid where only a portion of the data stored in that cache line is valid. Completion of a ReadUnique transaction on a partially valid cache line will result in the cache line becoming fully valid. The state of the cache line will accordingly move from UniqueP1 to UniqueP0. The state will move from either the UniqueP0 state 1104 or the UniqueP1 state 1106 to the Evicting state 1108 if an Eviction or Writeback request is received. In the Evicting state 1108, the cache line is in the process of being evicted, either as a result of a snoop, or because the entry was selected for spilling. Once the eviction completes, the cache line moves back to the Invalid state 1102.

In order to ensure the correct ordering of coherent transactions and state changes between the bus and coherent masters, the masters acknowledge the receipt of responses sent on the R (read response) and B (write response) channels by issuing signals on the RACK and WACK interfaces. This ensures that the bus can maintain a known order of transactions or responses sent on different interfaces such as between the R, B and AC (snoop request) channels. In this way, the bus ensures for example that a snoop cannot be received while a read response is in flight between the bus and the master.

The acknowledgement implies that any cache line state change required as a result of the response being received has occurred. The acknowledgement may be sent in the same order as the responses were received on the bus, for example on each snoop address channel. Therefore the memory interface will issue the acknowledgement signal (RACK and/or WACK) at the same time as updating the cache line status data structure as a result of a read or write response. The acknowledgement signal (RACK and/or WACK) may also be sent for CPU incoherent read and write responses. In order to drive these outputs from a single location, the memory interface may also receive incoherent responses and drive the acknowledgement signal output in the correct order with coherent responses.

Cache Bank Interface Module

The cache bank interface module 910 will now be described with reference to FIG. 12. The cache bank interface module can manage the issuing of flush commands from the spill control and snoop processors to the lowest-level cache banks. The module contains crossbar and arbitration logic and a flush buffer instance per cache bank. This permits flushes to be issued to each cache bank simultaneously. The cache bank interface is also responsible for preventing duplicate flushes which could cause data hazards.

Figure 12:
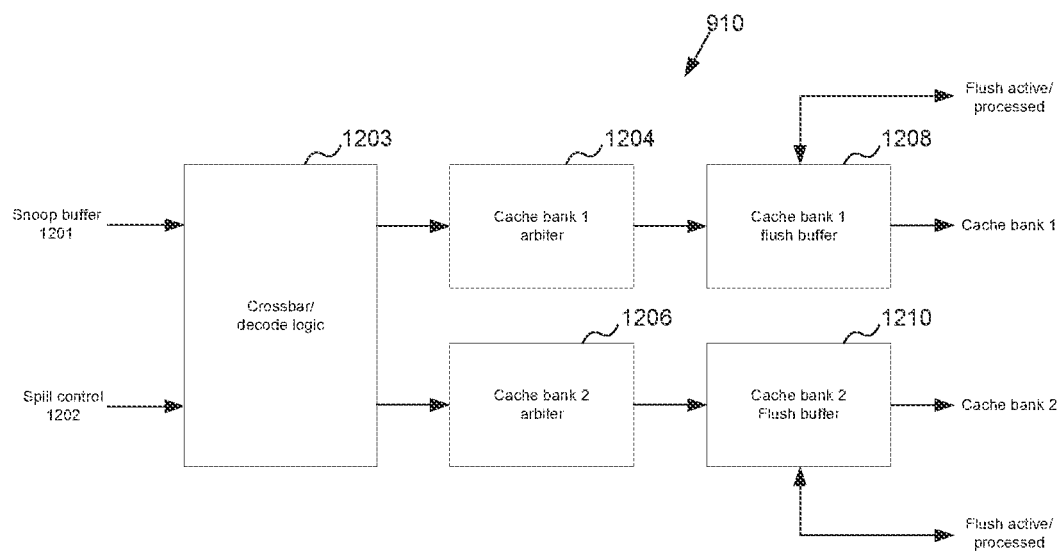
FIG. 12 schematically shows a cache bank interface architecture.

FIG. 12 illustrates an example of a cache bank interface where two cache banks, cache bank 1 331 and cache bank 2 332, are provided. Crossbar/decode logic 1203 is configured to receive a signal 1201 from the snoop processor 908, for example from a snoop buffer at the snoop processor and a signal 1202 from the spill control module 904. The crossbar/decode logic is coupled to two arbiters: a cache bank 1 arbiter 1204 and a cache bank 2 arbiter 1206. The cache bank 1 arbiter is coupled to a cache bank 1 flush buffer 1208, which is coupled to cache bank 1. The cache bank 2 arbiter is coupled to a cache bank 2 flush buffer 1210, which is coupled to cache bank 2.

In the illustrated example, the cache bank interface 910 has a single input 1202 from the spill control and one input from each snoop processor (illustrated as a single line 1201 from the snoop buffer in FIG. 12). The time taken to issue multiple flushes may be reduced by providing multiple inputs from the spill control unit, permitting the spill control unit to issue multiple flushes on the same cycle, as long as the multiple flushes are destined for different cache banks.

The crossbar/decode logic 1203 is configured to determine the destination cache bank for each flush input using the same address decode modes and hash functions used by the crossbar/decode logic 1004. Flush commands destined for each cache bank are arbitrated, for example using a round-robin policy, with equal priority to all request sources. The selected input flush is written into the flush buffer instance 1208, 1210 corresponding to that cache bank.

The flush buffer contains entries for all flushes in flight to a particular cache bank. An entry may be added to the flush buffer 1208, 1210 when the flush is selected by the crossbar arbitration logic 1203, and removed from the flush buffer once the corresponding flush processed bit is set by the cache bank. An exception to this is when duplicate flush hazards are detected, where a flush may be removed from the flush buffer without being issued to the cache bank, or not added to the buffer at all. The cache bank interface may be configured to detect such duplicate flush hazards by monitoring the write interface. Duplicate flushes can be prevented by making inactive any entries in the flush buffer with the same cache line address as an existing flush. Flushes stored in entries in the flush buffer 1208, 1210 may be sent to the cache bank on a FIFO basis. Each flush buffer entry may store one or more of the virtual cache line address, Context/PASID and reverse translation data structure entry number. Control bits may also be provided, for example to indicate whether a flush is active and/or whether the flush has been sent to the respective cache bank. The flush buffer depth may be 4 entries per cache bank.

Bus Mapping

The reverse translation data structure may comprise a list of memory addresses. Additionally or alternatively, the reverse translation data structure may comprise a list of one or more range of memory addresses. For example, the reverse translation data structure may comprise a start address and an end address of a range of memory addresses (or multiple start addresses and multiple end addresses of multiple ranges of memory addresses). The range of memory addresses may comprise odd addresses or even addresses. A group or set of memory addresses may comprise the list of memory addresses and/or the one or more range of memory addresses. More than one group or set of memory addresses may be provided. In one implementation, it can be determined whether the snooped address has a matching entry in the reverse translation data structure by comparing the snooped address with the group or set of memory addresses. The snooped address can be determined to have a matching entry in the reverse translation data structure where the snooped address is held within the reverse translation data structure or is within a range of addresses held within the reverse translation data structure.

Figure 13:
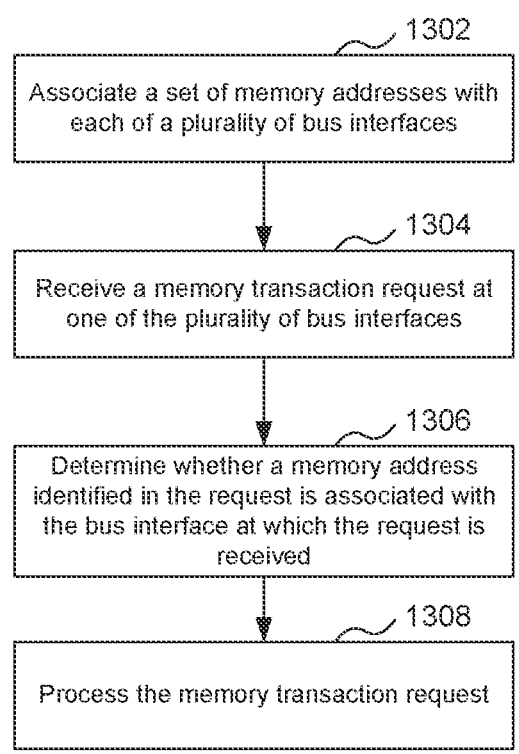
FIG. 13 illustrates a process for receiving a memory transaction request.

With reference to FIG. 13, the set of memory addresses may be associated with each of a plurality of bus interfaces 502 504 (1302), for example in the reverse translation data structure. On receiving a memory request such as a snoop request at one of the bus interfaces (1304), a memory address identified in the request is determined. This determination can be made by the memory interface, for example by a processor such as a snoop processor at the coherency manager. A determination is then made at the memory interface (for example at the coherency manager) as to whether the identified memory address is associated with the bus interface 502 504 at which the request was received (1306). This determination can be made with reference to the reverse translation data structure. For example, the determination at the memory interface (e.g. at the coherency manager) whether the identified memory address is associated with the bus interface at which the request was received can be made in dependence on the reverse translation data structure. A determination that the identified memory address is associated with the bus interface can be made, by the memory interface, where the identified memory address is contained in the list in the reverse translation data structure, and/or is part of or within the range or ranges of memory addresses in the reverse translation data structure associated with that bus interface.

It is useful to determine whether a memory address identified in a request is associated with a particular bus interface for the following reasons. Where multiple bus interfaces are present, and memory requests may be received over any of the bus interfaces, it is desirable to avoid processing duplicated requests. A memory request may be broadcast such that it is received over all the bus interfaces. That is, the same memory request may be received at each bus interface separately. This might be done, for example, where the bus does not have visibility of which bus interface is the correct bus interface to send the request over, and therefore sends the request over all of the bus interfaces to ensure that it is correctly processed. In this case, it is desirable for the request to only be processed where it is received over the correct bus interface. This can avoid multiple attempts to access the same data, and can reduce wasted processing. The 'correct' bus interface is suitably the bus interface that is associated with the memory address identified in the memory request, for example at the reverse translation data structure. In this way, it can be determined, for example at the snoop processor, whether or not the memory request should be processed.

If the identified memory address does not correspond to the set of memory addresses associated with the bus interface over which the request is received, then the request is suitably not processed. For example the request does not lead to the coherency manager querying the status of the page mapping, querying the cache line status data structure or accessing the cache. In some examples, the request might be ignored. However, this may lead to the occurrence of data clash and/or other data hazards. It is generally preferred to respond to each request, even where that request is not being processed. Thus, where the memory request is not processed, a response may nonetheless be sent, for example by the snoop processor. The response may indicate that the request has not been processed. Where the memory request is not processed, the snoop processor may be configured to respond as if the requested memory address is an Invalid cacheline.

If the identified memory address does correspond to the set of memory addresses associated with the bus interface over which the request is received, then the request is processed (1308). The request can be processed at the memory interface, for example at the snoop processor. Processing the request may involve one or more of querying the status of the page mapping at the reverse translation module, querying the cache line status data structure or accessing the cache.

This approach, of only processing requests received over the correct bus interface, can reduce processing overhead, for example by reducing the number of requests processed unnecessarily. The number of requests that propagate to the cache may be reduced, saving cache processing overhead.

In some examples, snoop requests may be issued on all AC ports and each snoop processor is configured to determine whether an address corresponding to the snooped address would be issued on the bus interface corresponding to that snoop processor, and will only look up the state of the cache line if the instance number (i.e. of the port and/or of the snoop processor (the instance number of the port and the snoop processor may be the same)) corresponds to the determined bus interface. Otherwise the snoop processor is configured to treat the cache line as Invalid.

An example of bus interface numbering for four cache banks is given in table 1.

TABLE 1

| | Bus Interface Number For Each Bank | | | |
|---|---|---|---|---|
| | Bank 0 | Bank 1 | Bank 2 | Bank 3 |
| Single bus | 0 | 0 | 0 | 0 |
| Dual bus | 0 | 1 | 0 | 1 |
| Quad bus | 0 | 1 | 2 | 3 |

In some examples the request comprises an address portion. The memory interface may be configured to map the address portion to a cache bank in a first mapping. The memory interface may be configured to map the cache bank to the bus interface in a second mapping. The memory interface may be configured to perform at least one of the first mapping and the second mapping by using a hash function, for example a single hash function. I.e. in one example a single hash function can perform both the first mapping and the second mapping.

The first mapping can be a one-to-one mapping between the address portion and the cache bank. The first mapping can permit a single address portion to map to more than one cache bank. The second mapping can be a one-to-one mapping between the cache bank and the bus interface. The second mapping can permit one or more cache banks to map to the same bus interface. This approach permits one bus interface to map to one cache bank, or a single bus interface to map to multiple cache banks. A particular cache bank may map to a single bus interface.

The memory interface may perform the first and/or the second mapping at the reverse translation module. The reverse translation data structure may comprise the first and/or the second mapping. A processor at the memory interface, such as a snoop processor, may be configured to perform the first and/or the second mapping.

Suitably the memory interface is configured to prevent duplicate flushes of a cache line causing multiple Writeback/Evict requests. Since it is possible for a cache line state to remain valid for a fully valid cache line for which a flush request is received, if multiple such flushes are erroneously issued, it can lead to multiple Writeback and/or Evict requests erroneously issued to memory. Therefore duplicate flushes should be avoided.

It is possible that both the snoop processor and the spill control modules intend to issue a flush to the same cache line, for example if spilling begins on an entry containing a Unique cache line and then a snoop is received for the same cache line, or vice versa. The cache bank interface may detect and removes incoming flushes which match an existing entry in the flush buffer, but once the entry has left the flush buffer the cache bank interface is no longer able to detect such a hazard. Therefore in addition to being sensitive to incoming write transactions, the snoop processor and the spill buffer module may be configured to be able to detect when the other issues a flush to the cache bank interface for a cache line for which they may issue a flush themselves. This approach also maintains the functionality where the cache bank interface is not present.

If both the spill control and the snoop processor attempt to issue a flush to the cache bank interface module on the same cycle, one will be selected by the cache bank interface arbiter and when enabled the other will detect this and cancel its own flush. Where one of the snoop processor and the spill buffer modules has issued a flush but is stalled by the cache line status module, both modules may only issue the flush to the cache bank interface on the same cycle as or after writing to the cache line status module. This ensures it is not possible for one module to miss a flush from the other while it is reading the cache line status RAM.

Early Processing of Snoop Requests

In a system with multiple cache banks in a particular cache, the reverse translation module, or the reverse translation data structure at the reverse translation module, provides the advantage that each of the cache banks need not be separately searched to determine the virtual address that corresponds to the physical address associated with a received memory request. The reverse translation module can identify the appropriate cache bank from the physical address associated with the received memory request. For example, the reverse translation module can maintain a table mapping physical addresses, or ranges of physical addresses to a plurality of cache banks. In this way, when a memory request is received, the reverse translation module can access the table to determine which of the plurality of cache banks the physical address maps into. Only the relevant cache bank of the plurality of cache banks need then be accessed. This can reduce load on the other cache banks, by avoiding accessing them unnecessarily, which might occur were they to be searched to identify the correct cache bank. This approach can therefore reduce interference in the operation of the cache, and/or of the cache banks, on receiving the memory request. Thus, access can be restricted to a cache bank which is known to, or is more likely to, return a cache hit in response to the memory request. Further, the reverse translation module can determine, that the cache does not comprise a mapping from the physical address of the memory request (e.g. none of the cache banks comprise a mapping from the physical address of the memory request, such as would occur when the requested cache line is not yet stored in the cache). In this situation the memory interface need not access the cache (e.g. any of the cache banks at the cache). This can improve performance, by allowing the determination that the physical address of the memory request is not mapped in the cache to be made without needing to access the cache itself. Thus, a response can be sent by the memory interface without accessing the cache. This can reduce the time taken to issue the response, and can reduce load on the cache.

In cases where the reverse translation data structure of the reverse translation module does not contain a particular physical address, for example because the processor has not accessed that physical address in the main memory, and so no cached version is yet provided in the cache, there need not be any attempted access to the cache, which would otherwise result in a cache miss. Instead, the cache access step can be omitted, and the reverse translation module can determine that there is (or would be) a cache miss. In response to determining that there is or would be a cache miss, the data at that particular physical address in the main memory can be accessed. This can reduce the latency of processing such a request where there would be a cache miss. This approach can also reduce unnecessary processing load on the cache.

The present techniques permit the processing of memory requests in a coherent memory space at the coherency manager so as to enable more efficient processing of memory requests. For example, the coherency manager is suitably able to process the memory requests such that the memory requests need not all be processed at or by the cache memory. Some memory requests, for example memory requests that would result in a cache miss if processed at the cache memory, need not be passed on to the cache memory. Rather, such memory requests are advantageously filtered out by the coherency manager so as not to take up processing time and/or bandwidth at the cache memory. The coherency manager may thus be seen as a 'pre-processor' which can reduce the processing load on the cache memory itself. Suitably, the coherency manager is operable at a speed which is at least the same as, if not faster than, the cache memory. Therefore processing memory requests at the coherency manager, rather than requiring all requests to pass to the cache memory, suitably increases the speed and/or efficiency of the system as a whole. The coherency manager is suitably configured to determine whether the identified memory address, i.e. the memory address identified in the memory request, is a memory address that is associated with a cache line at the cache memory. The coherency manager is suitably configured to process the memory request according to whether or not the cache memory comprises a cache line (and/or the status of the cache line, as will be further explained below) that is associated with the identified memory address.

Suitably the coherency manager is configured, responsive to determining that the memory address identified in the memory request is not associated in the reverse translation data structure with the cache memory, to output the response. Suitably the snoop processor is configured to output the response. Suitably the response is output on the bus. Suitably the coherency manager is configured to output the response directly. For example, the coherency manager is suitably configured to respond directly to such memory requests without needing to access the cache memory.

This approach has the advantage of permitting the memory request to be processed without incurring a processing cost of accessing the cache memory, without incurring a time cost due to latency at the cache memory, and/or without incurring a bandwidth cost of sending and receiving signals to and from the cache memory. This assists in permitting the coherency manager to efficiently process the memory request.

The coherency manager is suitably configured, responsive to determining at the snoop processor that the memory address identified in the memory request is associated in the reverse translation data structure with the cache memory, to process the memory request. Processing the memory request may involve querying the status in the reverse translation data structure of the virtual page corresponding to the physical page associated with the memory request. The snoop processor is configured to process the memory request in dependence on the status of the virtual page in the reverse translation data structure. Where the status of the virtual page is invalid, the snoop processor is suitably configured to respond to the memory request without needing to access the cache line status data structure or the cache. Where the status of the virtual page is valid, the snoop processor suitably accesses the relevant cache line status data structure entry corresponding to the required cache line. The snoop processor is configured to process the memory request in dependence on the status of the cache line in the cache line status data structure. Where the status of the cache line is invalid (for example where no data is stored at this cache line, data stored at the cache line is corrupt, data stored at this cache line is being evicted, and so on), the snoop processor is suitably configured to response to the memory request without needing to access the cache line at the cache. Where the status of the cache line is valid, the snoop processor may be configured to access the cache line at the cache, and to respond to the memory request in dependence on the accessed cache line.

The above approach can help to reduce the processing load and bandwidth consumed by the memory request. Further, this approach can reduce the time required to process the memory request, since accessing or querying the reverse translation data structure and/or the cache line status data structure, and outputting a response by the coherency manager in dependence on the result of that access or query may be faster than accessing the cache memory itself.

In some examples, there may not be a need for the memory request to be processed at the cache memory where the status of the cache line is Awaiting Eviction. In this case, the cache line is present in the cache memory but can be undergoing (at some stage in the process) an eviction, and possibly also a writeback if that is appropriate. In this case it may be desirable that a cache miss response is sent in response to the memory request. There is no need to access the cache memory to be able to send such a response. This is also true of the other examples described above. It is possible to determine that a cache miss would occur, and to cause the coherency manager to output the response accordingly.

The coherency manager may cause at least one of a writeback process and an evict process to be performed in respect of the cache line in dependence on the determination of the status of the cache line. Where the cache line status is determined to be clean (i.e. the data stored at the cache line in the cache is the same as that stored in the corresponding data entry in the main memory), and the data stored at the cache line is required by another cache, the data stored at the cache line can be evicted from the cache, so that it will not be inadvertently read in a subsequent transaction when it might no longer be up-to-date. Where the cache line is clean, there is no need for a writeback transaction, or writeback process, to occur. Thus, this arrangement permits a quick and efficient identification of the relevant cache line and the subsequent eviction of the data stored at this cache line from the cache. Avoiding an unnecessary read of the cache line before the data in it is evicted (if appropriate) further helps to reduce latency in the system.

Where the cache line status is determined to be dirty (i.e. the data in the cache line in the cache has been modified since the read from the main memory, and the version in the cache is up-to-date), the data in that cache line may be written back to the main memory before it is evicted from the cache. This is so that any subsequent transaction, such as a read transaction of the memory address corresponding to the cached data at the cache line, is able to access the up-to-date version of the corresponding data entry. If a writeback process is appropriate, the reverse translation module (for example the reverse translation data structure) can permit the determination of the virtual address so that the cache line in the cache can be accessed and the data in that cache line written back to the main memory.

Where data in a cache line is evicted from the cache without a writeback to the main memory, the cache line can be indicated to be invalid. This provides an indication that that cache line no longer holds valid data. Indicating the cache line to be invalid means that a subsequent read request to that cache line will be a cache miss. Indicating that the cache line is invalid can be done by using a flag or other status indicator in the cache, a flag or other status indicator in the status data structure, or similar. Hence, there is no need in all examples to overwrite the existing data entry in the cache, although this can be done, for example for added data security. The cache line which stored the evicted data can then become available immediately for writing new data into the cache.

This is not necessarily the case where a writeback transaction is desired. In this case, the data from that cache line will be read so that it can be written back to the main memory. Thus, the cache line may not be available for storing new data until this read transaction has completed, and possibly not until the corresponding writeback transaction on the main memory has completed. Typically, the data will remain in the cache line until a writeback acknowledgement has been received, indicating that the writeback transaction has indeed completed. The receipt of this writeback acknowledgement indicates that since the writeback transaction has completed, there is no longer a need to retain the data in that cache line in the cache. However, since, as discussed above, the main memory is typically much slower than the cache, there will tend to be an increase in latency due to the need to wait for the main memory to complete the transaction before the cache can proceed to complete the process of evicting the data in the cache line.

In some implementations, it is possible to reallocate a portion of a cache, for example a cache line, for storing new data before the writeback of data already present in that cache line to memory completes, i.e. before the writeback acknowledgement is received.

The allocation of a cache line for storing new data, for example data stored at a new physical address in the main memory, can be queued for later action. The queue can be formed at the memory interface. Data relating to the new allocation can be stored at the reverse translation module, for example at the reverse translation data structure. This permits subsequent read transactions, from either above or below the lowest-level cache in the hierarchy, for example from a processor associated with that cache or from a processor coupled to that cache via the memory interface, to be processed. For instance, even before the new allocation of data to a cache line is completed, it is possible to determine at the reverse translation module, for example from the reverse translation data structure, for a queued allocation request whether a subsequent read transaction on the cache for this new data would be a cache miss or a cache hit.

If the subsequent read transaction would be a cache miss, the memory interface can cause a response to be sent to the request to indicate that the request results in a cache miss. The cache itself need not be accessed.

Note that this response need not be sent immediately; the response may need to be output according to a particular order, such as in an order corresponding to the order of the incoming memory request. For example, this may be needed to satisfy a particular data protocol, as discussed below. Being able to process the received request in advance permits the saving of time. The response can be queued until it is to be output in the correct sequence.

If the subsequent read transaction would be a cache hit, which might otherwise have been a cache miss had the allocation request not been queued, then the result of the cache hit can be queued for response in due course. Note that, despite some delay in queuing the result of a cache hit for response, it is still likely to reduce the system latency since this process is likely to be quicker than if the result of the transaction was a cache miss, and the data was subsequently read from the slower main memory.

Suitably, the coherency manager is configured to cause the memory request to be sent to the cache memory for processing at the cache memory. For example, where a cache line is present in the cache memory, and the cache line status data structure indicates that, for example, the status of the cache line is Valid, the memory request can proceed to the cache memory. The cache memory can process the memory request. In dependence on, or as part of, processing the memory request, the cache memory is suitably configured to cause at least one of a writeback process and an evict process to be performed in respect of the cache line.

The cache line status data structure is not necessary in all examples. For example, where the cache line is present in the cache memory, the coherency manager may be configured to permit the memory request to pass to the cache memory, i.e. to proceed to the cache memory for processing. The status of the cache line at the cache memory need not be determined. However, where the cache line status data structure is present, it can advantageously be used to reduce the number of memory requests that the cache memory processes, thereby increasing efficiency.

Suitably, permitting the memory request to proceed to the cache memory comprises determining which of the plurality of cache banks at the cache memory is associated in the reverse translation data structure with the identified memory address, and passing the memory request to the respective cache bank in dependence on that determination. This approach permits the coherency manager to reduce the number of memory requests that proceed to any of the cache banks, and/or to permit the memory requests to be directed to the appropriate cache bank. For example, where a memory request such as a broadcast memory request is received over the bus, the coherency manager is suitably configured to determine which cache bank (if any) holds a cache line associated with the identified memory address. If a particular cache bank holds the relevant cache line, then the coherency manager may suitably direct the memory request to that cache bank. In a coherent memory system, a memory location in the shared memory is suitably claimed by one cache at a time. Thus, if the particular cache bank holds a cache line associated with the identified memory address, then no other cache bank would hold a cache line associated with the same identified memory address. This means that any memory requests to those other cache banks would be redundant. Any such memory request would waste resources, such as processing time and/or bandwidth. It is therefore desirable that the memory request is directed only to the appropriate cache bank. Suitably, the coherency manager is configured, in dependence on the determination of which cache bank is associated in the reverse translation data structure with the identified memory address, to pass the memory request only to that determined cache bank.

The coherency manager may be configured to monitor the bus (for example by monitoring the bus interfaces) for read requests to the memory, the read request identifying a read memory address and a response destination of the read request, and to associate in the reverse translation data structure the read memory address with the cache memory corresponding to the response destination.

Suitably the coherency manager is configured to associate the read memory address with the cache memory corresponding to the response destination by writing the read memory address to the reverse translation data structure. Monitoring the bus in this way permits the coherency manager to track which cache memories (or cache banks) claim ownership of which cache lines. It permits the coherency manager to automatically update the association in the reverse translation data structure between memory addresses and cache memories (or cache banks). Tracking the memory addresses of claimed cache lines in this way permits the coherency manager to be able to efficiently process subsequently received memory requests, such as snoop requests. The response destination suitably indicates the cache memory or cache bank of the device which issued the read request. In response to this read request, the coherency manager can associate the read memory address with the indicated cache memory or cache bank.

FIGS. 1-13 are shown as comprising a number of functional blocks. This is schematic only and is not intended to define a strict division between different logic elements of entities illustrated in the figures. Each functional block may be provided in any suitable manner. It is to be understood that intermediate values described herein as being formed by a memory interface and/or a coherency manager need not be physically generated by the memory interface and/or coherency manager at any point and may merely represent logical values which conveniently describe the processing performed by the memory interface and/or coherency manager between its (or their) input and output.

The memory interfaces and/or coherency managers described herein may be embodied in hardware on an integrated circuit. The memory interfaces and/or coherency managers described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processor executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processor.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a memory interface and/or a coherency manager configured to perform any of the methods described herein, or to manufacture a memory interface and/or a coherency manager comprising any apparatus described herein. An integrated circuit definition dataset may be, for example, an integrated circuit description.

There may be provided a method of manufacturing, at an integrated circuit manufacturing system, a memory interface and/or a coherency manager as described herein. There may be provided an integrated circuit definition dataset that, when processed in an integrated circuit manufacturing system, causes the method of manufacturing a memory interface and/or a coherency manager to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user step (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a memory interface and/or a coherency manager will now be described with respect to FIG. 14.

Figure 14:
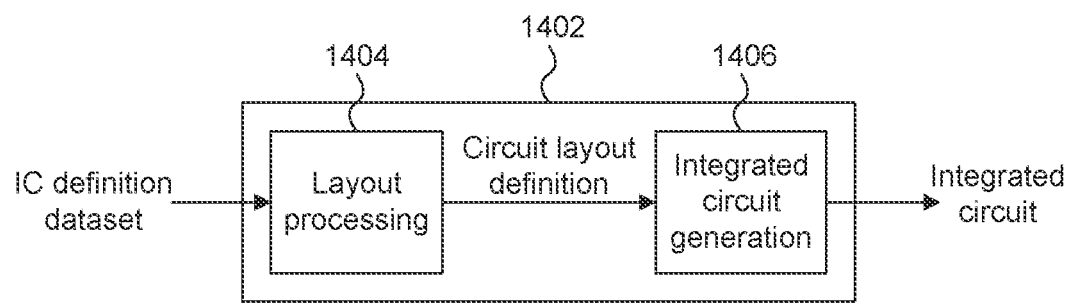
FIG. 14 is a schematic diagram of an integrated circuit manufacturing system.

FIG. 14 shows an example of an integrated circuit (IC) manufacturing system 1402 which is configured to manufacture a memory interface and/or a coherency manager as described in any of the examples herein. In particular, the IC manufacturing system 1402 comprises a layout processing system 1404 and an integrated circuit generation system 1406. The IC manufacturing system 1402 is configured to receive an IC definition dataset (e.g. defining a memory interface and/or a coherency manager as described in any of the examples herein), process the IC definition dataset, and generate an IC according to the IC definition dataset (e.g. which embodies a memory interface and/or a coherency manager as described in any of the examples herein). The processing of the IC definition dataset configures the IC manufacturing system 1402 to manufacture an integrated circuit embodying a memory interface and/or a coherency manager as described in any of the examples herein.

The layout processing system 1404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1404 has determined the circuit layout it may output a circuit layout definition to the IC generation system 1406. A circuit layout definition may be, for example, a circuit layout description.

The IC generation system 1406 generates an IC according to the circuit layout definition, as is known in the art. For example, the IC generation system 1406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1406 may be in the form of computer-readable code which the IC generation system 1406 can use to form a suitable mask for use in generating an IC.

The different processes performed by the IC manufacturing system 1402 may be implemented all in one location, e.g. by one party. Alternatively, the IC manufacturing system 1402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a memory interface and/or a coherency manager without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 14 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 14, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method for interfacing, at a memory interface, between a memory bus and a cache memory, the memory interface comprising a plurality of snoop processors configured to receive snoop requests from the memory bus, each snoop processor being associated with a respective bus interface, the method comprising:
   receiving a snoop request at a respective bus interface associated with the snoop processor;
   each snoop processor determining whether the snoop request relates to its associated respective bus interface; and
   each snoop processor processing the snoop request in dependence on that determination.

2. A non-transitory computer readable storage medium having stored thereon a computer readable description of an integrated circuit that, when processed in an integrated circuit manufacturing system, causes the integrated circuit manufacturing system to manufacture a memory interface for interfacing between a memory bus and a cache memory, the memory interface comprising a plurality of snoop processors configured to receive snoop requests from the memory bus, wherein each snoop processor is associated with a respective bus interface and each snoop processor is configured, on receiving a snoop request from the respective bus interface associated with the snoop processor, to determine whether the snoop request relates to the said respective bus interface and to process the snoop request in dependence on that determination.

3. A memory interface for interfacing between a memory bus and a cache memory, the memory interface comprising a plurality of snoop processors configured to receive snoop requests from the memory bus, wherein each snoop processor is associated with a respective bus interface and each snoop processor is configured, on receiving a snoop request from the respective bus interface associated with the snoop processor, to determine whether the snoop request relates to said respective bus interface and to process the snoop request in dependence on that determination.

4. A memory interface according to claim 3, in which the memory interface comprises a data structure configured to maintain a mapping between each of the plurality of bus interfaces and respective sets of memory addresses.

5. A memory interface according to claim 3, in which the cache memory comprises a plurality of cache banks, and each bus interface is configured to transfer data to one or more cache bank associated with that bus interface.

6. A memory interface according to claim 5, in which each snoop processor is configured to map the memory addressed by the snoop request to a cache bank of the plurality of cache banks in a first mapping, and to map the cache bank to one of the plurality of bus interfaces in a second mapping.

7. A memory interface according to claim 6, in which each snoop processor is configured to perform at least one of the first mapping and the second mapping by using a hash function.

8. A memory interface according to claim 4, in which each snoop processor is configured to determine that the snoop request does not relate to the bus interface associated with that snoop processor where at least one of:
the memory addressed by the snoop request does not map to the bus interface associated with that snoop processor; and
the mapping does not comprise the memory addressed by the snoop request.

9. A memory interface according to claim 3, comprising a cache line status data structure configured to store status information relating to cache lines at the cache memory, each snoop processor being configured to generate a response to the snoop request in dependence on status information stored in the cache line status data structure if the snoop request relates to the bus interface associated with that snoop processor.

10. A memory interface according to claim 3, in which at least one of the snoop processors is configured, on determining that the snoop request does not relate to the bus interface associated with that snoop processor, to cause a response to be sent on the bus without accessing the cache memory.

11. A memory interface according to claim 3, in which each snoop processor comprises a bus calculation module for calculating the bus interface to which the snoop request relates.

12. A memory interface according to claim 11, in which the memory interface comprises a data structure configured to maintain a mapping between each of the plurality of bus interfaces and respective sets of memory addresses, and the bus calculation module is configured to calculate the bus interface to which the snoop request relates in dependence on the mapping maintained at the data structure.

13. A memory interface according to claim 11, in which each snoop processor is configured to map the memory addressed by the snoop request to a cache bank of a plurality of cache banks in a first mapping, and to map the cache bank to one of the plurality of bus interfaces in a second mapping, and the bus calculation module is configured to perform at least one of the first mapping and the second mapping.

14. A memory interface according to claim 3, in which each snoop processor comprises a buffer for storing received snoop requests.

15. A memory interface according to claim 14, in which each snoop processor is configured to process snoop requests on the buffer in a different order to that in which the snoop requests were received.

16. A memory interface according to claim 3, in which the memory addressed by the snoop request is a physical address in a physical address space, and the cache memory uses a virtual address space, the memory interface comprising a reverse translation module configured to maintain a mapping from the physical address space to the virtual address space, the reverse translation module being configured to translate the snoop request to a translated snoop request addressed in the virtual address space.

17. A memory interface according to claim 16, in which the reverse translation module comprises a reverse translation data structure configured to maintain a mapping from the physical address space to the virtual address space.

18. A memory interface according to claim 17, in which the reverse translation data structure comprises a directory linking a physical address in the physical address space to a corresponding virtual address in the virtual address space.

19. A memory interface according to claim 3, wherein the cache memory is the lowest level of a cache hierarchy of a device connected to the memory bus.

20. A memory interface according to claim 3, wherein the memory interface is embodied in hardware on an integrated circuit.

* * * * *